United States Patent
Wang et al.

(10) Patent No.: US 11,824,954 B2
(45) Date of Patent: Nov. 21, 2023

(54) RELIABLE TRANSPORT PROTOCOL AND HARDWARE ARCHITECTURE FOR DATACENTER NETWORKING

(71) Applicant: Google LLC, Mountain View, CA (US)

(72) Inventors: Weihuang Wang, Los Gatos, CA (US); Prashant R. Chandra, San Jose, CA (US); Srinivas Vaduvatha, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/857,620

(22) Filed: Jul. 5, 2022

(65) Prior Publication Data

US 2022/0337675 A1 Oct. 20, 2022

Related U.S. Application Data

(62) Division of application No. 16/819,327, filed on Mar. 16, 2020, now Pat. No. 11,463,547.

(60) Provisional application No. 62/947,036, filed on Dec. 12, 2019.

(51) Int. Cl.
*H04L 67/55* (2022.01)
*H04L 1/1829* (2023.01)

(52) U.S. Cl.
CPC ............ *H04L 67/55* (2022.05); *H04L 1/1832* (2013.01)

(58) Field of Classification Search
None
See application file for complete search history.

(56) References Cited

U.S. PATENT DOCUMENTS

| | | |
|---|---|---|
| 6,330,226 B1 | 12/2001 | Chapman et al. |
| 6,330,451 B1 | 12/2001 | Sen et al. |
| 6,424,625 B1 * | 7/2002 | Larsson ............... H04L 1/1806 370/410 |
| 7,305,486 B2 | 12/2007 | Ghose et al. |
| 2005/0081246 A1 | 4/2005 | Barrett et al. |
| 2005/0135394 A1 | 6/2005 | Sethi et al. |
| 2007/0008883 A1 | 1/2007 | Kobayashi |
| 2007/0211631 A1 | 9/2007 | Rahman et al. |
| 2007/0253401 A1 | 11/2007 | Jiang |

(Continued)

OTHER PUBLICATIONS

Montazeri, Behnam et al. "Homa: a Receiver-Driven Low-Latency Transport Protocol Using Network Priorities." SIGCOMM '18, Aug. 20-25, 2018, Budapest, Hungary. pp. 221-235.

(Continued)

*Primary Examiner* — Joshua Joo
(74) *Attorney, Agent, or Firm* — Lerner David LLP

(57) ABSTRACT

A communication protocol system is provided for reliable transport of packets. Transport of packets includes transmitting, by a sender entity over a connection to a receiver entity, a plurality of packets in a first order, maintaining, by the sender entity, one or more sliding windows including a plurality of bits, wherein each bit of the sliding window represents a respective packet of the plurality of packets, receiving, by the sender entity, one or more acknowledgments indicating that one or more of the plurality of packets have been received by the receiver entity, each of the acknowledgments referencing a respective packet of the plurality of packets and modifying, by the sender entity, values of one or more of the plurality of bits in the sliding window corresponding to the one or more acknowledgments received.

20 Claims, 21 Drawing Sheets

(56) References Cited

U.S. PATENT DOCUMENTS

| | | | |
|---|---|---|---|
| 2008/0008211 A1 | 1/2008 | Zilbershtein et al. | |
| 2008/0165684 A1 | 7/2008 | Sridharan et al. | |
| 2009/0007141 A1 | 1/2009 | Blocksome et al. | |
| 2010/0118780 A1 | 5/2010 | Umesh et al. | |
| 2010/0274848 A1 | 10/2010 | Altmaier et al. | |
| 2011/0134930 A1* | 6/2011 | McLaren | H04L 1/188 |
| | | | 370/401 |
| 2012/0278400 A1* | 11/2012 | Elson | H04L 47/722 |
| | | | 709/206 |
| 2012/0287814 A1 | 11/2012 | Roberts et al. | |
| 2013/0055263 A1 | 2/2013 | King et al. | |
| 2013/0163417 A1 | 6/2013 | Gupta | |
| 2015/0195747 A1 | 7/2015 | Ho et al. | |
| 2017/0063606 A1 | 3/2017 | Babu | |
| 2017/0149913 A1 | 5/2017 | Olomskiy | |
| 2017/0187598 A1 | 6/2017 | Andreyev et al. | |
| 2017/0201601 A1 | 7/2017 | Bright et al. | |
| 2017/0244643 A1* | 8/2017 | Lawrence | H04L 67/10 |
| 2018/0097853 A1 | 4/2018 | Wiley et al. | |
| 2018/0102975 A1 | 4/2018 | Rankin | |
| 2018/0218294 A1* | 8/2018 | Dantzig | G06F 9/5038 |
| 2018/0287904 A1* | 10/2018 | Brummel | H04L 47/32 |
| 2019/0190542 A1 | 6/2019 | Wang et al. | |
| 2020/0084150 A1* | 3/2020 | Burstein | H04L 47/805 |
| 2020/0145881 A1 | 5/2020 | Mitra et al. | |
| 2021/0037442 A1 | 2/2021 | Ong et al. | |
| 2022/0078866 A1* | 3/2022 | Ohta | H04W 40/22 |

OTHER PUBLICATIONS

Rajiullah, Mohammad. "Towards a Low Latency Internet: Understanding and Solutions." Sep. 2015. Dissertation. Department of Computer Science, Karlstad University, Sweden. 58 pages.

Vernersson, Andreas. "Analysis of UDP-based Reliable Transport using Network Emulation." 2015. Master's Thesis. Master of Science in Engineering Technology Computer Science and Engineering. Luleå University of Technology. 93 pages.

Wu, Haitao et al. "ICTCP: Incast Congestion Control for TCP in Data-Center Networks." IEEE/ACM Transactions on Networking, vol. 21, No. 2, Apr. 2013. pp. 345-358.

Partial European Search Report for European Patent Application No. 20207349.0 dated Apr. 1, 2021. 14 pages.

Extended European Search Report for European Patent Application No. 20207349.0 dated Jul. 5, 2021. 13 pages.

* cited by examiner

| | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| 0 | Ver | RSVD | | |
| 1 | FV R Host | PF | VF | type Proto Type Packet Type AR |
| 2 | Expected Data Window Base Packet Sequence Number (eDBSN) | | | |
| 3 | Expected Request Window Base Packet Sequence Number (eRBSN) | | | |
| 4 | Packet Sequence Number (PSN) | | | |
| 5 | Request Sequence Number (RSN) | | | |

Base header / Destination CID

FIGURE 12A

Base header fields

| Field | Width | Description |
|---|---|---|
| Version | 4 | |
| Dest CID | 24 | |
| Function Valid (FV) | 1 | Destination function number |
| Host | 3 | |
| PF | 6 | |
| VF | 11 | |
| Function Type | 2 | |
| Proto Type | 3b | 001b: Name of RT protocol<br>010b: Name of ULP protocol<br>011b: Name of storage protocol |
| Packet Type | 4b | 0000b: pull request<br>0001b: push request<br>0010b: push grant<br>0011b: pull data<br>0100b: push solicited data<br>0101b: push unsolicited data<br>0110b: re-sync packet<br>0111b: ACK<br>1000b: NACK<br>1001b: ping |
| PSN | 32 | Packet sequence number on TX direction for reliable delivery. For pushReq and pullReq, this is the request sliding window PSN; for other packets, this is the data sliding window PSN. |
| RSN | 32 | ULP transaction sequence number. For ordered connection, RSN represent order; for unordered connection, RSN is unique transaction identifier. |
| eDBSN | 32 | Expected base packet sequence number on RX direction for the Data sliding window. |
| eRBSN | 32 | Expected base packet sequence number on RX direction for the request sliding window (pushReq and pullReq). |

FIGURE 12B

Pull request header fields

| Field | Width | Description |
|---|---|---|
| Request Length | 16 | Length in Byte for returning pull response packet. |

FIGURE 13D

Push request header fields

| Field | Width | Description |
|---|---|---|
| Solicitation Sequence Number (SSN) | 32 | Used for push request ordering.<br><br>Target RT must issue push grant in the RSN order, i.e. incremental SSN, to avoid protocol deadlock in ordered connection. |
| Request Length | 16 | Length in Byte for outgoing push data packet. |

FIGURE 13E

Push grant header fields

| Field | Width | Description |
|---|---|---|
| Request Length | 16 | Refer to push request packet field of same name. |
| SSN | 32 | Refer to push request packet field of same name. |

FIGURE 13F

Pull data header

Push solicited data header

Push unsolicited data header

Resynchronization header

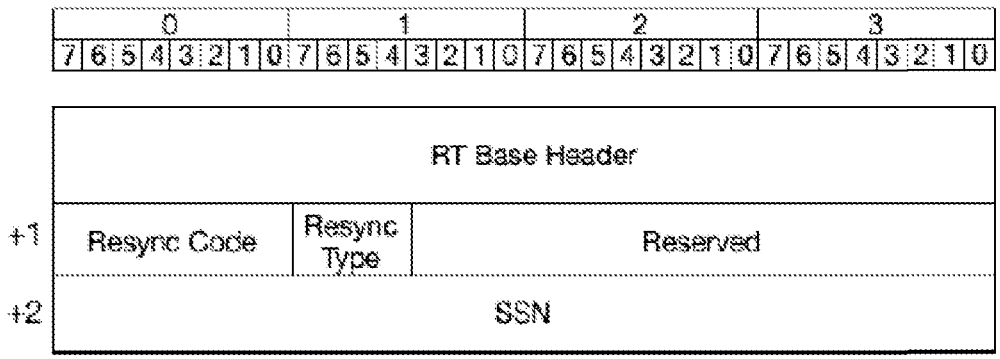

FIGURE 15A

Resynchronization header fields

| Field | Width | Description |
|---|---|---|
| Resync Code | 8b | 0x1: target ULP compl-in-error resync<br>0x2: local xFLR resync<br>0x3: local packet retransmission time-out resync |
| Resync Type | 4b | PacketType field of original packet that is being resync-ed. |
| SSN | 32b | Valid SSN number only of Resync Type is Solicited Push request or Push Grant. |

FIGURE 15B

Acknowledgment header

| Byte | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| 0 | Ver | RSVD | Destination CID | |
| 1 | FV \| R \| Host \| PF | VF | | type \| Proto Type \| Packet Type \| AR |
| 2 | Receiver Expected Data Window Base Sequence Number (eDBSN) | | | |
| 3 | Receiver Expected Request Window BSN (eRBSN) | | | |
| 6–7 | Receiver Data Window Sequence Bitmap 127:0 | | | |
| 8–9 | Receiver Request Window Sequence Bitmap 63:0 | | | |
| 10 | t1 | | | |
| 11 | t2 | | | |
| 12–13 | | | | |

FIGURE 16A

Acknowledgment header fields

| Field | Width | Description |
|---|---|---|
| NACK (N=0) | 1b | This bit must be set to 0b by the receiver if this is an ACK packet. |
| t1 | 32b | For t1 and t2 in microsecond (and thereafter t3 and t4) |
| t2 | 32b | |
| CC-meta-data | 64b | Congestion control meta-data. |

FIGURE 16B

Negative acknowledgment header

| | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | Ver | | | | RSVD | | | | | | | | | | | | | | | | | | | | | | | | | | | | |
| 1 | FV | R | Host | | | | | | PF | | | | | | | | VF | | | | | | | | ty pe | | Proto Type | | Packet Type | | AR | |
| 2 | Destination CID | | | | | | | | | | | | | | | | | | | | | | | | | | | | | | | |
| 3 | Receiver Expected Data Window BSN (eDBSN) | | | | | | | | | | | | | | | | | | | | | | | | | | | | | | | |
| 4 | Receiver Expected Request Window BSN (eRBSN) | | | | | | | | | | | | | | | | | | | | | | | | | | | | | | | |
| 5 | NACK Sequence Number | | | | | | | | | | | | | | | | | | | | | | | | | | | | | | | |
| 6 | NACK code | | | | | | | | RSVD | | | | | | | | RNR-NACK timeout | | | | | | | | Wn 6 | | Reserved | | | | | | ULP-NACK-code | | | | | | | |
| 7 | t1 | | | | | | | | | | | | | | | | | | | | | | | | | | | | | | | |
| 8 | t2 | | | | | | | | | | | | | | | | | | | | | | | | | | | | | | | |
| 9 | | | | | | | | | | | | | | | | | | | | | | | | | | | | | | | | |

FIGURE 17A

Negative acknowledgment header fields

| Field | Width | Description | | | |
|---|---|---|---|---|---|
| NACK (N=1) | 1b | This bit must be set to 1b by the receiver if this is an ACK packet. | | | |
| NACK code | 8b | | | | |
| NACK Sequence Number | 32b | PSN being NACK-ed. | | | |
| wnd | 1b | NACK sliding window.<br>0x1: request packet sliding window.<br>0x0: data packets sliding window. | | | |
| RNR-NACK timeout | 8b | Value | Delay in milliseconds | Value | Delay in milliseconds |
| | | 00000b | 655.36 | 10000b | 2.56 |
| | | 00001b | 0.01 | 10001b | 3.84 |
| | | 00010b | 0.02 | 10010b | 5.12 |
| | | 00011b | 0.03 | 10011b | 7.68 |
| | | 00100b | 0.04 | 10100b | 10.24 |
| | | 00101b | 0.06 | 10101b | 15.36 |
| | | 00110b | 0.08 | 10110b | 20.48 |
| | | 00111b | 0.12 | 10111b | 30.72 |
| | | 01000b | 0.16 | 11000b | 40.96 |
| | | 01001b | 0.24 | 11001b | 61.44 |
| | | 01010b | 0.32 | 11010b | 81.92 |
| | | 01011b | 0.48 | 11011b | 122.88 |
| | | 01100b | 0.64 | 11100b | 163.84 |
| | | 01101b | 0.96 | 11101b | 245.76 |
| | | 01110b | 1.28 | 11110b | 327.68 |
| | | 01111b | 1.92 | 11111b | 491.52 |
| t1 | 32b | For t1 and t2 in microsecond (and thereafter t3 and t4) | | | |
| t2 | 32b | | | | |

FIGURE 17B

RELIABLE TRANSPORT PROTOCOL AND HARDWARE ARCHITECTURE FOR DATACENTER NETWORKING

CROSS-REFERENCE TO RELATED APPLICATIONS

This application is a divisional of U.S. patent application Ser. No. 16/819,327 filed Mar. 16, 2020 which claims the benefit of the filing date of U.S. Provisional Patent Application No. 62/947,036 filed Dec. 12, 2019, the disclosures of which are hereby incorporated herein by reference.

BACKGROUND

The Internet protocol suite is a set of communication protocols used for servicing data transmissions between two devices communicating information over the Internet or other computer networks. Transmission Control Protocol ("TCP") is a part of the Internet protocol suite that provides for connection-oriented, reliable, and ordered delivery of a stream of data packets between, for example, a web-browser application running on a client device and a web-server application running on a server device over a local or wide area network. Currently, datacenters using communication protocols such as TCP encounter certain issues. For instance, incast is a many-to-one communication pattern commonly found in datacenters, which may result in incast congestion when multiple synchronized computing devices send data to a same receiver computing device in parallel. Further, because the current communication protocols require ordered delivery of packets over a connection, a long tail latency, which is the amount of time for the last few packets among a series of packets to be transmitted, may prevent transmission of the next series of packets BRIEF SUMMARY The present disclosure provides for determining, by an initiator entity, that outgoing data is to be transmitted to a target entity; transmitting, by the initiator entity to the target entity, a solicited push request requesting the outgoing data to be placed at the target entity; receiving, by the initiator entity from the target entity, a push grant in response to the solicited push request; and transmitting, by the initiator entity to the target entity, the outgoing data to be placed at the target entity in response to the push grant.

The method may further comprise determining, by the initiator entity, that a size of the outgoing data meets a predetermined threshold, wherein transmitting the solicited push request is based on the determination that the size of the outgoing data meeting the predetermined threshold. The push request may originate from an upper layer protocol of the initiator entity, based on which a reliable transport protocol layer of the initiator entity transmits the solicited push request as a packet over a connection between the initiator entity and the target entity.

The method may further comprise determining, by the initiator entity, that a size of the outgoing data does not meet a predetermined threshold; and transmitting, by the initiator entity, the outgoing data to be placed at the target entity without sending the solicited push request or receiving the push grant. The push request may originate from an upper layer protocol of the initiator entity, based on which a reliable transport protocol layer of the initiator entity sends the outgoing data as a packet over a connection between the initiator entity and the target entity.

The method may further comprise receiving, by the initiator entity from the target entity, an acknowledgment indicating that the outgoing data is received and placed at the target entity.

The method may further comprise determining, by the initiator entity, that incoming data is needed from the target entity; transmitting, by the initiator entity to the target entity, a pull request requesting the incoming data to be transmitted to the initiator entity; receiving, by the initiator entity from the target entity, the incoming data in response to the pull request. The method may further comprise scheduling, by the initiator entity based on one or more congestion parameters, the pull request for incoming data.

The present disclosure further provides for transmitting, by a sender entity over a connection to a receiver entity, a plurality of packets in a first order; maintaining, by the sender entity, at least one sliding window including a plurality of bits, wherein each bit of the sliding window represents a respective packet of the plurality of packets; receiving, by the sender entity, one or more acknowledgments indicating that one or more of the plurality of packets have been received by the receiver entity, each of the acknowledgments referencing a respective packet of the plurality of packets, wherein the acknowledgments are received in a second order different from the first order; and modifying, by the sender entity, values of one or more of the plurality of bits in the sliding window corresponding to the one or more acknowledgments received.

The method may further comprise adjusting, by the sender entity, a size of the sliding window based on one or more congestion parameters.

The plurality of packets may include one or more of: requests for data packets, data packets, acknowledgments. The at least one sliding windows may include a request sliding window. The at least one sliding windows may include a data sliding window. The plurality of packets may include at least one data packet in response to a pull request. The plurality of packets may include at least one push grant packet in response to a solicited push request.

The present disclosure still further provides for transmitting, by an initiator entity to a target entity over a connection, a plurality of packets; determining, by the initiator entity, that neither an acknowledgment nor a negative acknowledgment has been received in response to a particular packet of the plurality of packets within a predetermined period of time; retransmitting, by the initiator entity to the target entity based on the determination, the particular packet; receiving, by the initiator entity from the target entity in response to the retransmission, a negative acknowledgement; and determining, by the initiator entity based on the negative acknowledgment, whether to wait for an acknowledgment for the particular packet or to resynchronize.

The method may further comprise determining, by the initiator entity, that the negative acknowledgment indicates that the target entity is not ready for the particular packet; and waiting, by the initiator entity, for an acknowledgment from the target entity in response to the negative acknowledgment without another retransmission of the particular packet to the target entity.

The method may further comprise determining, by the initiator entity, that the negative acknowledgment indicates that operation for the particular packet is completed in error by the target entity; and transmitting, by the initiator entity to the target entity, a resynchronization packet without tearing down the connection. The method may further comprise receiving, by the initiator entity from the target entity, an acknowledgment in response to the resynchronization packet; and transmitting, by the initiator entity, a next plurality of packets in response to the acknowledgment to the resynchronization packet.

The plurality of packets may be transmitted according to requests from an upper layer protocol of the initiator entity, and the retransmission of the particular packet is performed by a reliable transport protocol layer of the initiator entity.

BRIEF DESCRIPTION OF THE DRAWINGS

FIG. 12A shows an example base header according to aspects of the technology.

FIG. 12B shows example definitions for the example base header of FIG. 10A according to aspects of the technology.

FIGS. 13D, 13E, and 13F show example definitions for the example headers of FIGS. 13A, 13B, and 13C respectively according to aspects of the technology.

FIG. 15A shows an example resynchronization header according to aspects of the technology.

FIG. 15B shows example definitions for the example resynchronization header of FIG. 15A according to aspects of the technology.

FIG. 16A shows an example negative acknowledgment header according to aspects of the technology.

FIG. 16B shows example definitions for the example negative acknowledgment header of FIG. 16A according to aspects of the technology.

FIG. 17A shows an example complete-in-error acknowledgment header according to aspects of the technology.

FIG. 17B shows example definitions for the example complete-in-error acknowledgment header of FIG. 17A according to aspects of the technology.

DETAILED DESCRIPTION

The technology generally relates to communication protocols for reliable transport of packets over a connection. The technology provides solicitation based push transactions, which provides a receiver entity control over incoming data and thus reduce incast congestion and tail latency. The technology further supports unordered transactions over a connection using sliding windows and bitmaps, which may increase overall efficiency in handling of packets over the connection. The technology further provides handling of failed transmissions that reduces retransmission attempts and uses resynchronization to prevent tearing down of connections, thus resulting in more resilient connections.

Figure 1:
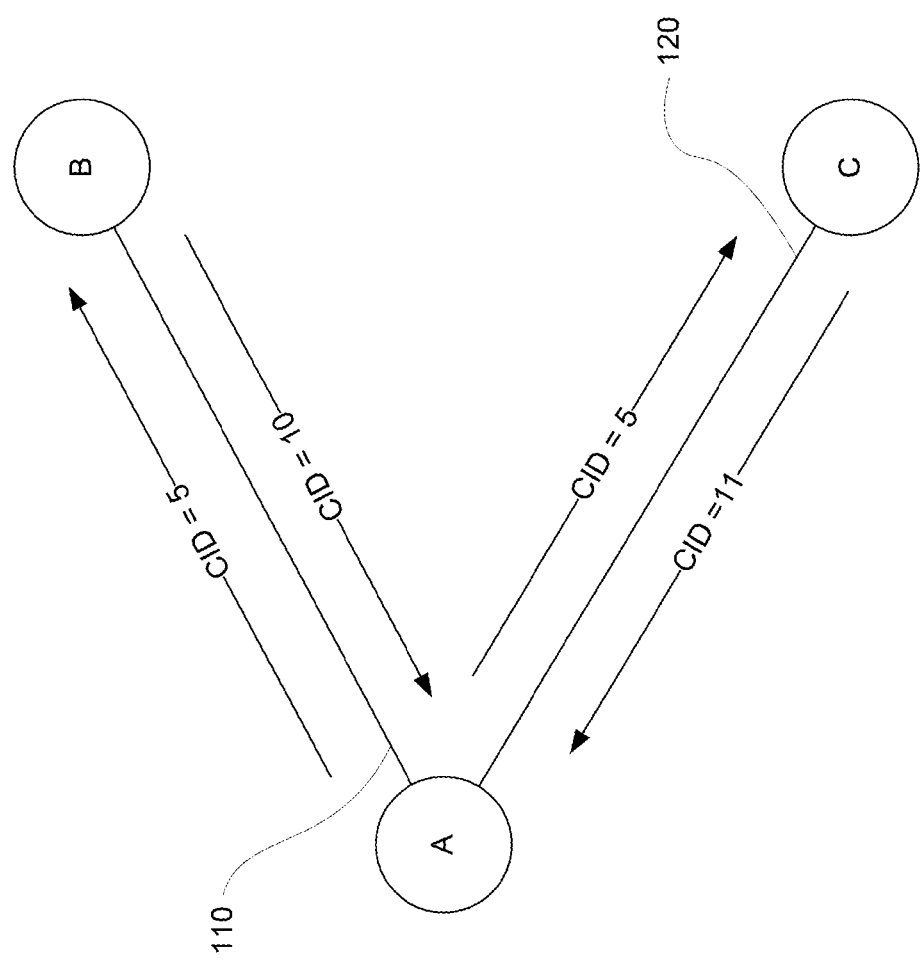
FIG. 1 is a schematic diagram of a network according to aspects of the technology.

FIG. 1 shows an example network 100. The network 100 includes various entities, such as entity A, entity B, and entity C. In order to communicate with one another, connections are formed between the entities, such as connection 110 between entities A and B, and connection 120 between entities A and C. The entities may communicate over the connections using one or more protocols. For example, a reliable transport (RT) protocol is a protocol which notifies the sender whether or not the delivery of data to an intended receiver was successful. A sender and a receiver are considered peers of a communication protocol, thus entities A and B may be reliable transport peers, and entities A and C may be reliable transport peers. A connection over which reliable transport protocol is used is an end-to-end construct that describes a bidirectional communication channel between two reliable transport peers.

A connection may be identified by a pair of Connection IDs ("CIDs"), one in each direction of communication. CIDs may be allocated by a receiver entity during connection setup process and have no global significance outside of the parties involved. Thus, the connection 110 between entities A and B may have a CID with value 5 for the direction from A to B, and a CID with value 10 for the direction from B to A. The connection 120 between entities A and C may have a CID value 5 for the direction from A to C and a CID with value 11 for the direction from C to A. Further, CIDs assigned by an entity or "Source CIDs" of an entity must have different values. Thus in the example shown, the CIDs assigned by entity A or Source CIDs of entity A have different values 10 and 11. In contrast, "Destination CIDs" of an entity are assigned by other entities and may have the same value. Thus in the example shown, the Destination CIDs of entity A are assigned by entities B and C respectively, which may have the same value 5.

Packets may be transmitted over the connections between the entities. In this regard, a packet is a basic unit of communication across a connection. A packet may have a predetermined size, for example up to a maximum transfer unit ("MTU") in length. A packet may have a header including information about the packet and its transmission, and a payload of data. To ensure reliable transport, a reliable transport packet may include the Destination CID, such as in a header. For example, when entity B receives a packet over the connection 110 with the Destination CID of 5, entity B may identify the packet as coming from entity A, and may then notify A that the packet has been received by sending an acknowledgment over the connection 110 referencing this packet and its CID of 5. The acknowledgment itself may be sent as a packet including the Destination CID of 10.

Figure 2:
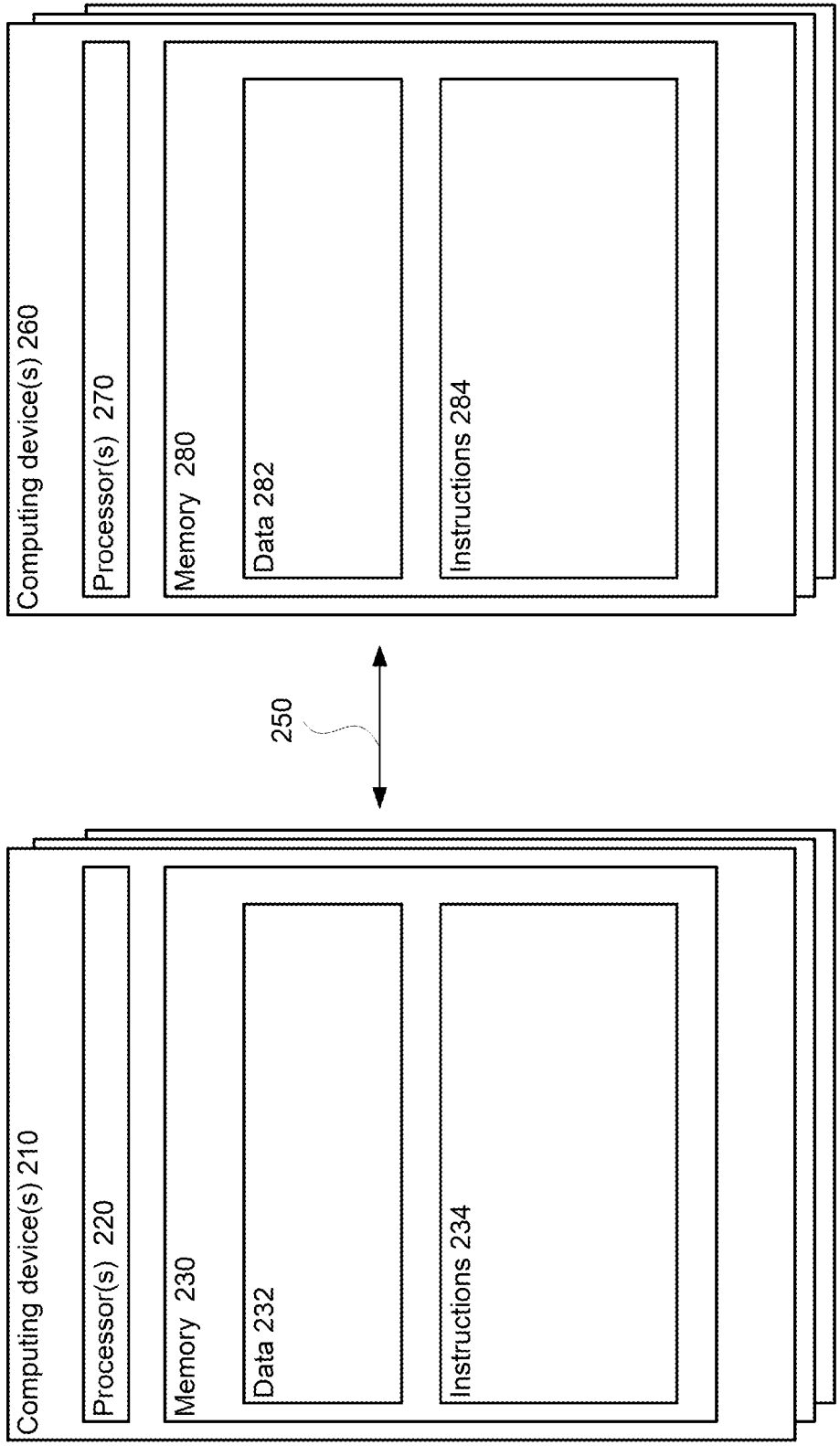
FIG. 2 is a block diagram of an example system according to aspects of the technology.

Entities A, B, and C may be any type of device capable of communicating over a network, such as personal computing devices, sever computing devices, mobile devices, wearable devices, virtual machines, etc. FIG. 2 is a block diagram of some components in an example system 200 that can communicate using a reliable transport protocol. The system 200 includes at least two entities having one or more connections between them. It should not be considered as limiting the scope of the disclosure or usefulness of the features described herein. In this example, the system 200 is shown with two entities, one or more computing devices 210 and one or more computing devices 260, with a connection 250 between them. For example, computing devices 210 may be entity A and computing devices may be entity B of FIG. 1, and connection 250 may be connection 110 of FIG. 1. The computing devices 210 and 260 may be configured with similar components as shown, or may include additional and/or different components. In the example shown, the computing devices 210 contain one or more processors 220 and memory 230.

The one or more processors 220 can be any conventional processors, such as a commercially available CPU. Alternatively, the processors can be dedicated components such as an application specific integrated circuit ("ASIC") or other hardware-based processor. Although not necessary, the one or more of the computing devices 210 may include specialized hardware components to perform specific computing processes.

The memory 230 can be of any non-transitory type capable of storing information accessible by the processor, such as a hard-drive, memory card, ROM, RAM, DVD, CD-ROM, write-capable, and read-only memories. Memory 230 of the computing devices 210 can store information accessible by the one or more processors 220, including data 232 and instructions 234.

Memory 230 can include data 232 that can be retrieved, manipulated or stored by the processors 220. For example, data such as communication protocols, connection information such as CIDs, definitions of headers, etc., as described with respect to FIG. 1 and FIGS. 3-17B may be retrieved, manipulated, or stored by the processors 220.

Memory 230 of the computing devices 210 can also store instructions 234 that can be executed by the one or more processors 220. For instance, instructions such as communication protocols as described with reference to FIGS. 1 and 3-11, and flow diagram of FIG. 18 may be performed by the one or more processors 220 according to instructions 234 and data 232 in memory 230.

Data 232 may be retrieved, stored, or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

Although not shown, computing devices 210 may further include other components typically present in general purpose computing devices. For example, computing devices 210 may include output devices, such as displays (e.g., a monitor having a screen, a touch-screen, a projector, a television, or other device that is operable to display information), speakers, haptics, etc. The computing devices 210 may also include user input devices, such as a mouse, keyboard, touch-screen, microphones, sensors, etc.

Although FIG. 2 functionally illustrates the processor, memory, and other elements of computing devices 210 as being within the same block, the processor, computer computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 210 may be capable of directly and indirectly communicating with other entities of a network, such as computing devices 260. Computing devices 210 and 260 may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
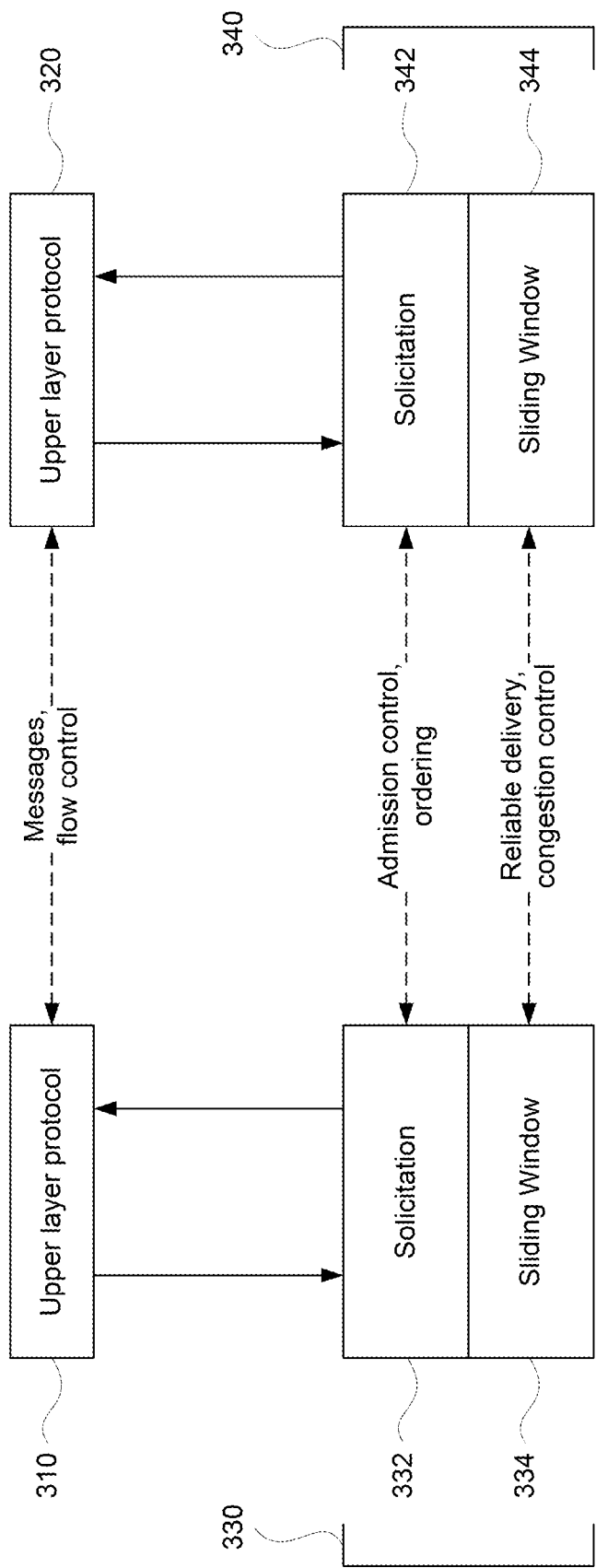
FIG. 3 is a block diagram of communication layers according to aspects of the technology.

Returning to FIG. 1, packets may be transmitted between the entities A, B, and/or C over the connections using one or more communication protocols. FIG. 3 shows an example communication protocol system 300. The communication protocol system 300 may be implemented on two or more entities in a network, such as two or more of entities A, B, C of network 100 of FIG. 1, for example by processors 220 and 270 of FIG. 2. As shown, each entity may include multiple layers of communication protocols. For example, entity A may include upper layer protocol ("ULP") 310 and reliable transport ("RT") protocol 330, and entity B may include upper layer protocol 320 and reliable transport protocol layer 340. Peers may be formed between protocols of each layer. Thus, ULP 310 and ULP 320 are ULP peers, and reliable transport protocol layer 330 and reliable transport protocol layer 340 are RT peers. Further as shown, within each entity, the upper layer protocols are configured to communicate with the reliable transport protocols.

As described with reference to FIGS. 4-11, the upper layer protocols 310, 320 may be responsible for implementing the hardware/software interface, processing of messages, completion notifications, and/or end-to-end flow control. The upper layer protocols may be implemented on any of a number of hardware or software devices. For example, the upper layer protocols may be implemented as Remote Direct Memory Access ("RDMA"). As another example, the upper layer protocols may be implemented as a Non-Volatile Memory Express ("NVMe").

Also described with reference to FIGS. 4-11, the reliable transport protocols 330, 340 may be responsible for reliable delivery of packets, congestion control, admission control, and/or ordered or unordered delivery of packets. Each reliable transport protocols 330, 340 may logically be partitioned into two sublayers of protocols. Thus as shown, reliable transport protocol layer 330 is partitioned into a solicitation sublayer 332 that is responsible for end-point admission control and optionally ordered delivery of packets, and a sliding window sublayer 334 that is responsible for end-to-end reliable delivery and congestion control. Likewise, reliable transport protocol layer 340 is also divided into a solicitation sublayer 342 and a sliding window sublayer 344.

Figure 4:
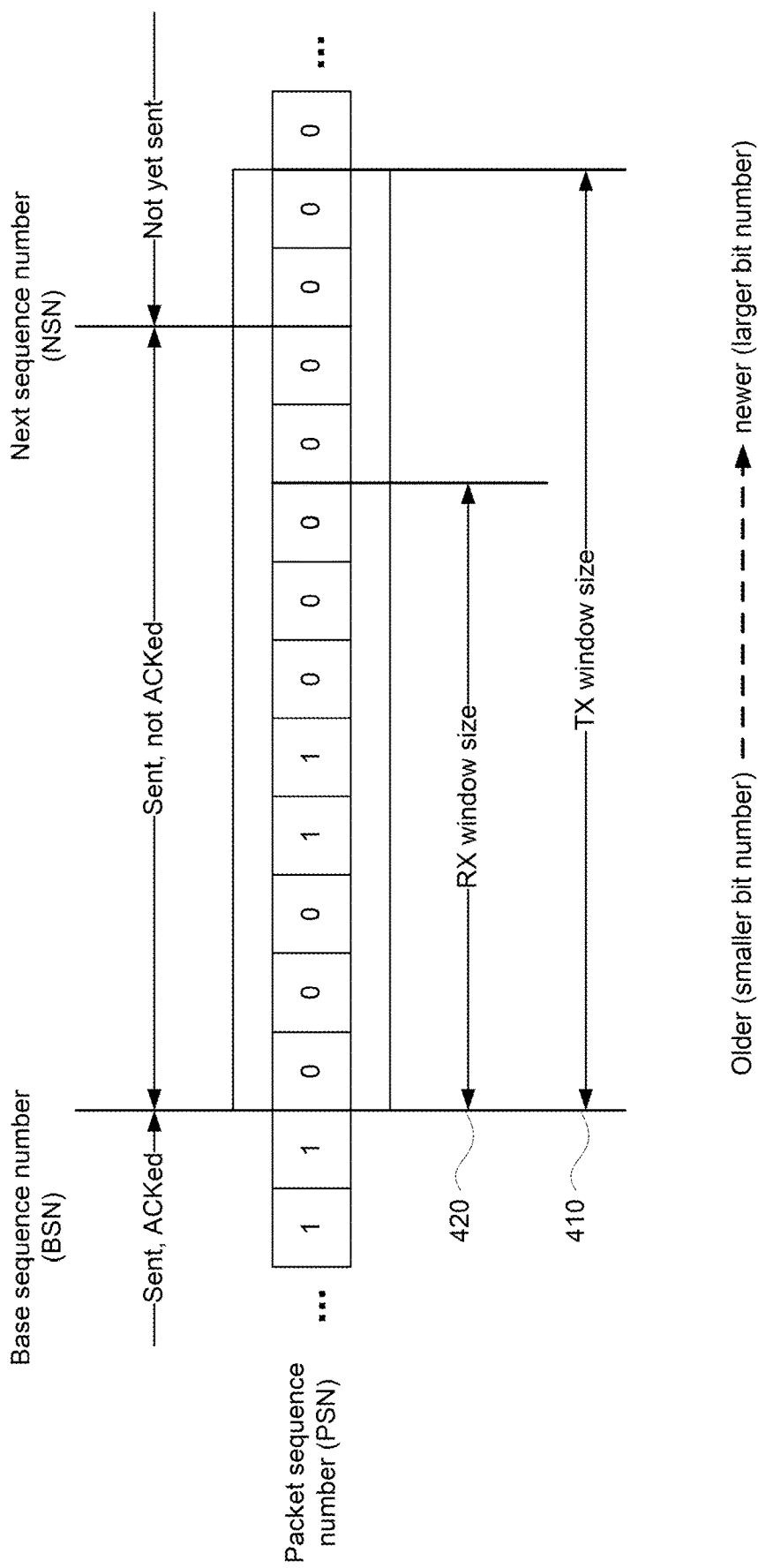
FIG. 4 illustrates an example sliding window according to aspects of the technology.

FIG. 4 shows example sliding windows 410 and 420. The sliding windows 410 and 420 are used by entities to keep track of a predetermined number of packets to be transmitted and acknowledged over a connection. For example, entity A may use the TX sliding window 410 for keeping track of packets sent to the entity B over the connection 110, and use the RX sliding window 420 for keeping track of packets received from the entity B. As such, the sliding windows 410 and 420 may be respectively implemented in the sliding window sublayer 334 that is part of the reliable transport protocol layer 330 of FIG. 3. The TX sliding window and the RX sliding window may have different sizes as shown, or may alternatively have the same size.

Referring to the TX sliding window 410, to keep track of the packets, each packet is assigned a Packet Sequence Number ("PSN") by the sender entity A. As shown, the bit number increases from left to right. The receiver entity B may acknowledge the packets it has received within the sliding window by communicating to the sender entity A the PSN it has received within the window in an acknowledgement packet. In this regard, a Sequence Number Bitmap may be provided on both the sender entity A and the receiver entity B. Each bit of the Sequence Number Bitmap represents one packet within a sliding window at the entity. For example, for the TX sliding window 410, a bit is set to 1 if a sent packet has been acknowledged. Otherwise the bit is 0. Once all packets within the TX sliding window 410 are received and acknowledged, the sender entity A may move the sliding window 410 forward to the next set of packets to be transmitted. The sliding window moves forward once the base sequence number packet is acknowledged, thus referring to the example in FIG. 4, the sliding window moves by one once the left most 0 is marked, and moves by another one once the second-left-most 0 is marked, and by three once the third 0 is marked (since the two following bits are already set).

PSN for the sender entity may include Base Sequence Number ("BSN") and Next Sequence Number ("NSN"). As shown, BSN is the PSN value of the oldest packet that is yet to be acknowledged by the receiver entity B. Further as shown, NSN is the PSN value that should be assigned to the next packet transmitted over the connection to receiver entity B. For instance, when a packet is received from ULP 310 for transmission, the current PSN may be updated to NSN. Then when the packet is transmitted over the connection, NSN may be incremented, for example with NSN=(NSN+1) mod $2^{32}$. As such, within the sliding window 410, Bit 0 represents a PSN value of BSN and Bit n represents a PSN value of (BSN+n).

Although not shown, the receiver entity may also keep one or more sliding windows. For example, a RX sliding window may be kept by receiver entity B for the packets received, where each bit represents a packet to be received with the sliding window. The bit is set to 1 if the packet has been received by the receiver entity B. Otherwise the bit is 0. The receiver entity B may also use PSN to keep track of received packets. For instance, BSN may be the PSN value of the oldest packet that is yet to be received by the receiver entity. When a packet is received with a PSN value of BSN, the BSN may be updated to the next lowest PSN of the packet that has not yet been received, for example with BSN=(BSN+1) mod $2^{32}$. The update of the BSN may clear the bits in the Sequence Number Bitmap corresponding to packets from the previous BSN to the PSN. As such, within the RX sliding window for the receiver entity B, Bit 0 represents a PSN value of BSN and Bit n represents a PSN value of (BSN+n). Because sender entity A does not acknowledge the acknowledgements sent by receiver entity B, that is, PSN is not used for the acknowledgment packets, the receiver entity B need not keep a TX sliding window for the acknowledgements it sends.

The sender entity and receiver entity may handle the packets and the respective acknowledgements according to a set of rules. For instance, if the receiver BSN in a received packet is smaller than the sender entity's BSN, the sender entity discards the ACK information; otherwise, the sender entity updates its BSN to match the receiver entity's BSN. After adjusting its BSN, the sender entity applies an OR operation on the receiver entity's Sequence Number Bitmap in the ACK packet with its own Sequence Number Bitmap. After a packet is transmitted, it is buffered by the sender entity until it is acknowledged by the receiver entity. With respect to retransmission of failed packets, the sender entity may be configured to free up resources allocated to all ACK packets in a retransmit buffer. Further, upon per packet retransmit timer expiry, the sender entity retransmits the packet with the same PSN as the original packet, and increment a retransmission counter for that packet.

The receiver entity may also implement a number of rules. For instance, if the PSN value of the received packet is less than the BSN of the received packet, the receiver entity discards the packet and sends an ACK packet with the current BSN. If the PSN value falls within the receiver entity's sliding window, the receiver entity updates the Sequence Number Bitmap by setting the bit at location (PSN-BSN) to 1. If the bit at location (PSN-BSN) was already 1, the packet is discarded; otherwise the packet is delivered to the ULP of the receiver entity and a cumulative ACK counter is incremented. If the PSN of the received packet is equal to BSN of the received packet, the receiver entity updates the BSN to be equal to the next highest PSN that has not been received.

Note that, because the packets are tracked according to bitmaps, the sliding windows are configured to allow the entities to keep track of packets received and/or acknowledged out-of-order within the respective sliding window. Thus as shown, although packets represented by bits 3 and 4 may be sent by entity A before the packets represented by bits 0, 1, and 2, the packets represented by bits 3 and 4 may be received and/or acknowledged before the packets represented by bits 0, 1, 2 in the TX sliding window 410.

Network congestion may be detected by monitoring packet retransmission and/or packet round-trip latencies. To perform congestion control, a size of the one or more sliding windows may be adjusted. For example, if congestion is high, it may take longer for all packets within the TX sliding window 410 to be received and/or acknowledged by entity B. As such, to reduce congestion, the number of outstanding packets in the network may be reduced by decreasing the size of the sliding window 410. In addition to or as alternative to changing the size of the sliding window, retransmission timer expiry value in response to network congestion status may be adjusted. For example, retransmitting less frequently might reduce network congestion.

Figure 5:
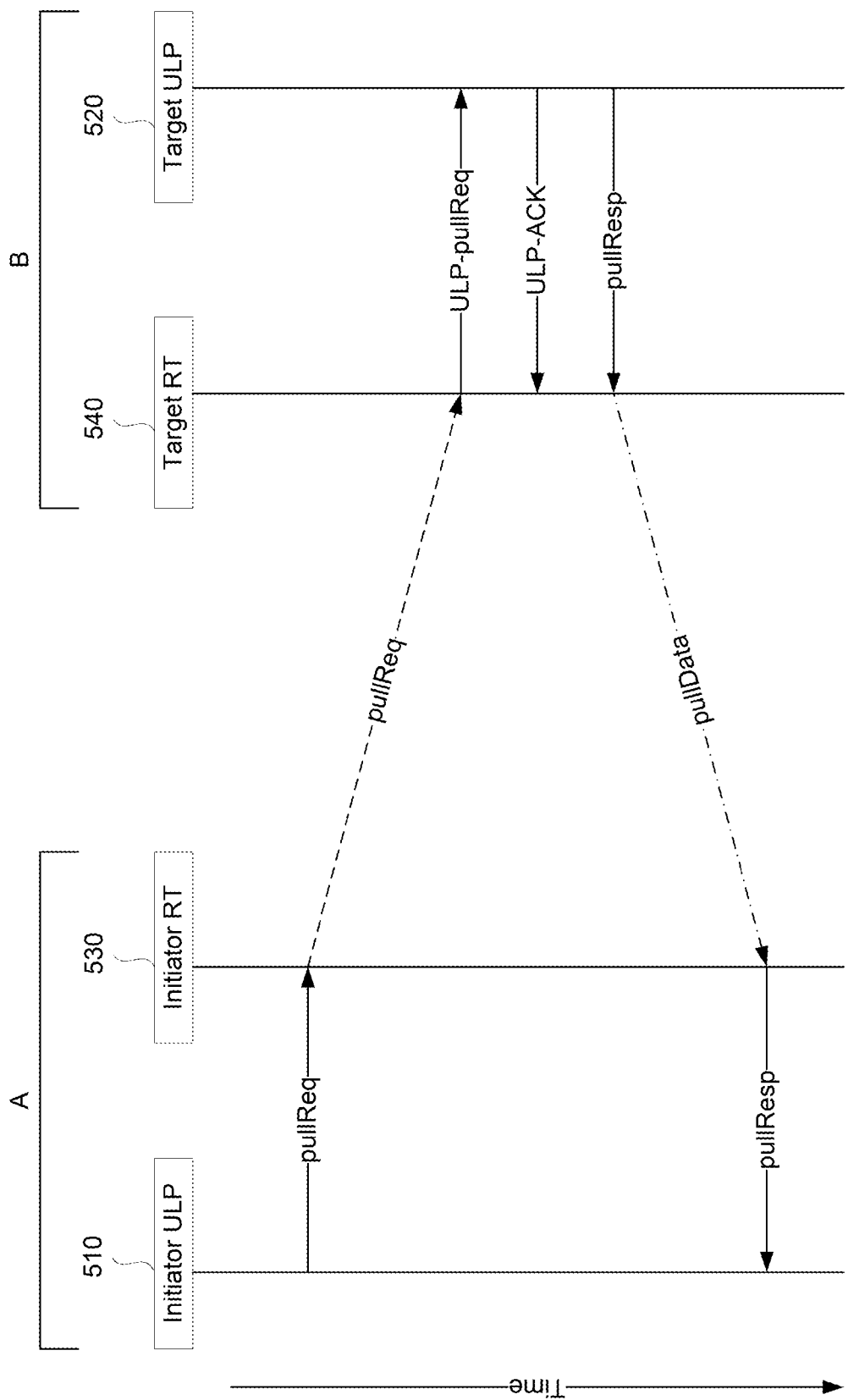
FIG. 5 is an example timing diagrams of a pull transaction according to aspects of the technology.
Figure 6:
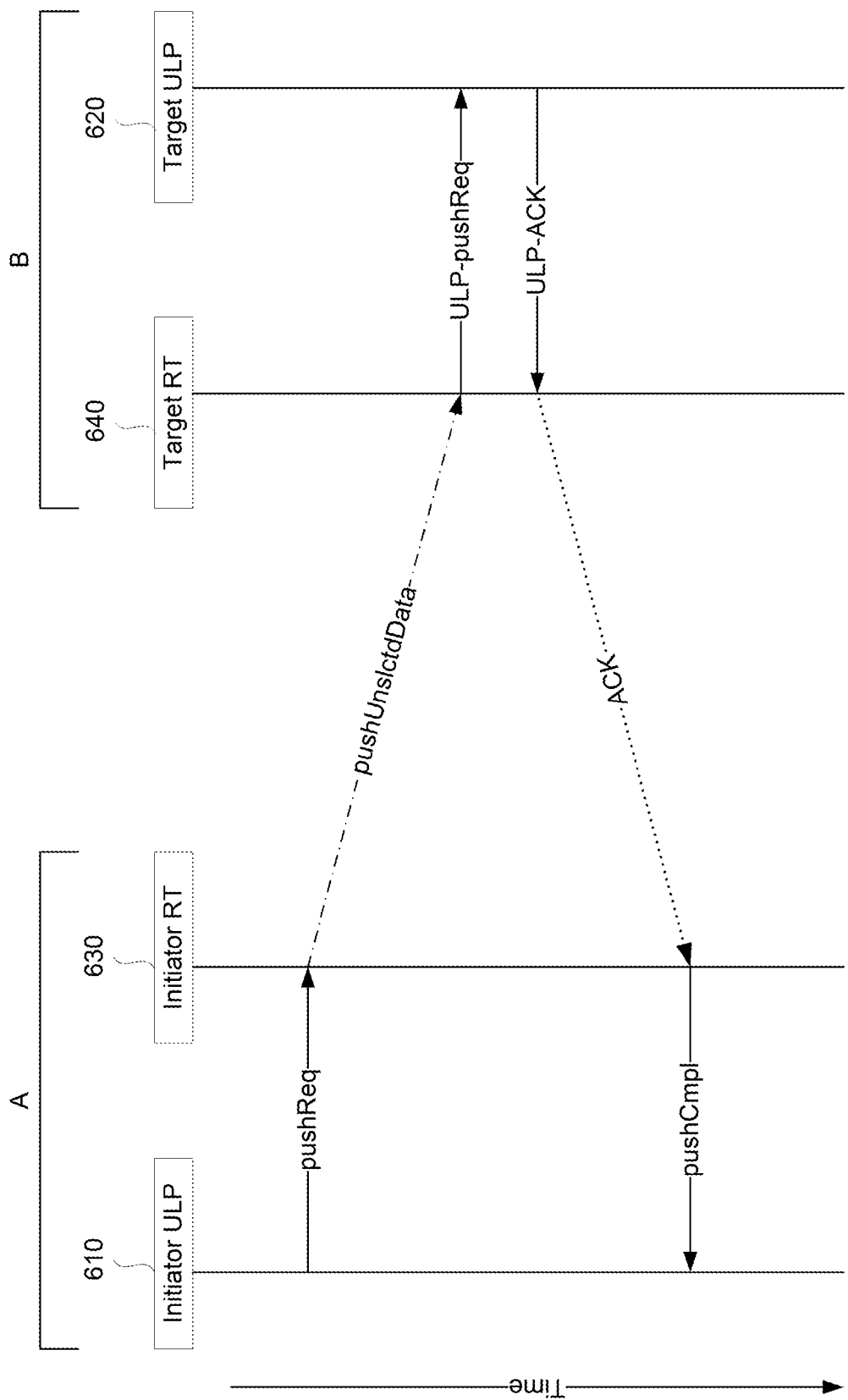
FIG. 6 is an example timing diagram of unsolicited push transaction according to aspects of the technology.
Figure 7:
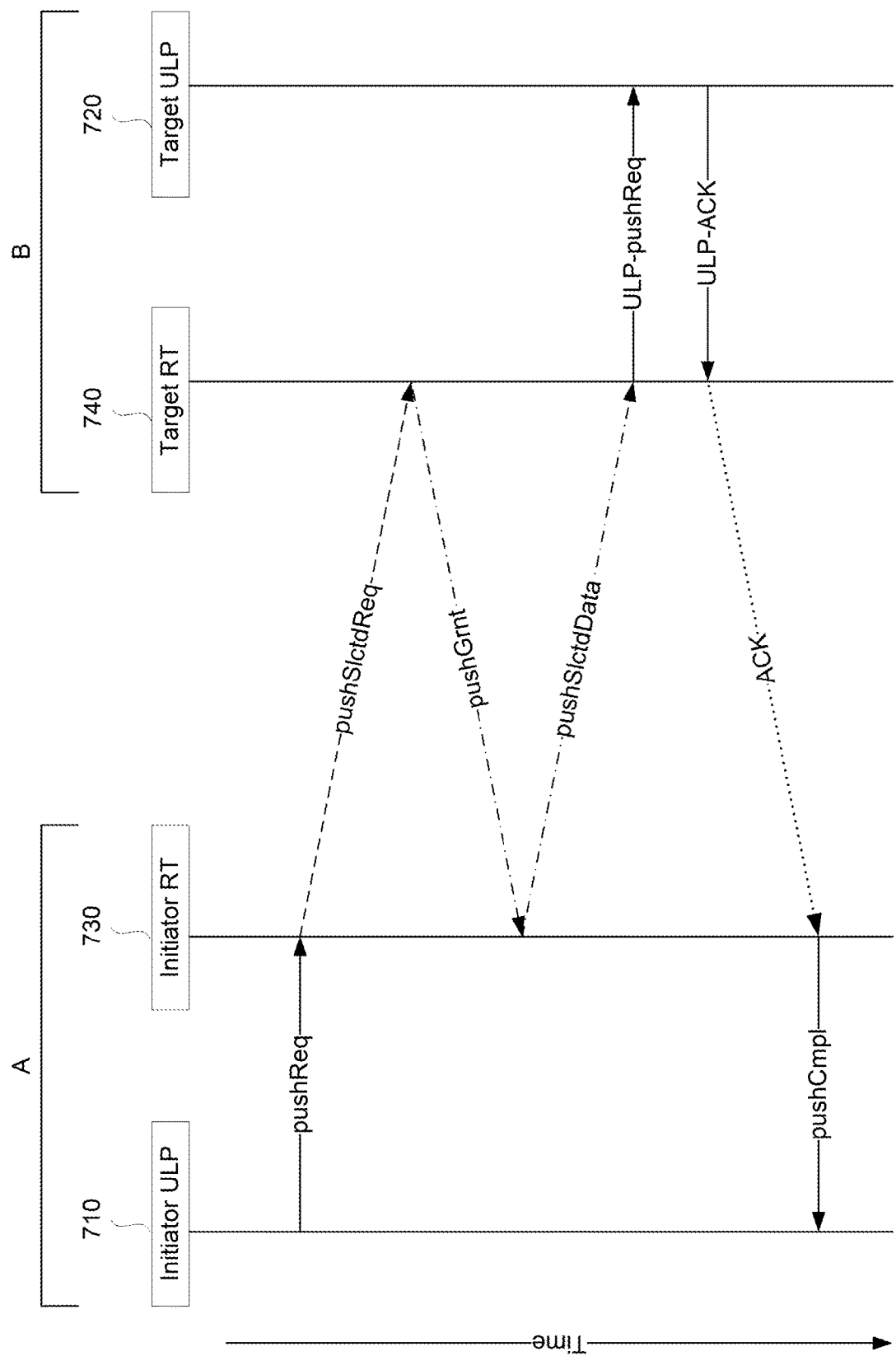
FIG. 7 is an example timing diagram of solicited push transaction according to aspects of the technology.

The communication protocol system 300 of FIG. 3 may support various transactions, including both pull and push transactions. The communication protocol system 300 of FIG. 3 may be configured to perform the transactions using an initiator-target approach, where an "initiator" is the entity that requests a transaction, and a "target" is the entity that responds to the request. Such a transaction may involve multiple packets to be transmitted between the initiator and target entities, thus the initiator and the target entities may be both sender and receiver of packets in the transaction, and may keep track of packets and/or acknowledgements using TX and/or RX sliding windows as described with reference to FIG. 4. FIG. 5 shows an example timing diagram for a pull transaction according to aspects of the technology, and FIGS. 6 and 7 show example timing diagrams for push transactions according to aspects of the technology. The example timing diagrams of FIGS. 5-7 may be implemented by two entities in a network, such as entities A and B over connection 110 of FIG. 1, for example by processors 220 and 270 of FIG. 2.

Referring to FIG. 5, the timing diagram 500 is shown for an example pull transaction. A pull transaction may be used to "pull" incoming data packets from other entities, for example for a read operation. As shown, the pull transaction is performed by various communication protocol layers of both the initiator entity and the target entity. For example, entity A may be the initiator entity and initiator ULP 510 and initiator RT 530 may be communication protocol layers configured as upper layer protocol 310 and reliable transport protocol layer 330 of FIG. 3, while entity B may be the target entity and target ULP 520 and target RT 540 may be communication protocol layers configured as upper layer protocol 320 and reliable transport protocol layer 340 of FIG. 3.

As shown, a pull request ("pullReq") originates from the initiator entity A, for instance from the initiator ULP 510, which is sent to the initiator RT 530. The initiator entity A may send the pullReq to the target entity B from which incoming data is requested, for instance over the connection 110. This may be performed by the respective RTs, thus the initiator RT 530 is shown sending the pullReq to the target RT 540. Once the pullReq is received by the target entity B, the target RT 540 subsequently sends the pullReq to the target ULP 520 to request permission. The target ULP 520 may then send an acknowledgment message ("ULP-ACK") to the target RT 540 acknowledging the pullReq, as well as a pull response ("pullResp") instructing the target RT 540 to pull the requested data. In response to the pullResp, the target RT 540 may pull the requested data ("pullData"), and send the pulled data to the initiator RT 530, for instance over the connection 110. Once the requested data is received by the initiator RT 530, the initiator RT 530 may send a pullResp to the initiator ULP 510 so that the initiator ULP 510 may place or store the received data packet.

As described with reference to FIG. 1, the initiator entity A and the target entity B may communicate with each other by transmitting packets. Thus the pullReq and pullData may each be a packet transmitted over the connection 110, delivered by respective RTs. Further as described with reference to FIG. 4, reliable transport packets may be tracked by sliding windows. As such, the pullReq packet may be part of a request TX sliding window kept by entity A (indicated by dash line), while the pullData packet may be part of a data TX sliding window kept by entity B (indicated by dash dot line). Each of these packets may be reliable transport packets for which an acknowledgment is required. For instance, although not shown, entity B may send an ACK to entity A referencing the PSN of the pullReq packet, which entity A may keep track of using the request TX sliding window. Likewise, entity A may send an ACK to entity B referencing the PSN of the pullData packet, which entity B may keep track of using the data TX sliding window.

As illustrated by FIG. 5, the pull transaction allows an initiator entity to perform end-to-end flow control. In particular, the initiator ULP may perform end-to-end flow control by rate limiting pullReq packets to limit the number and/or amount of outstanding pull data, which may prevent incast-induced congestion in the network. As such, incast congestion may be avoided. For instance, the initiator ULP may be configured to request incoming data packets based on a schedule that does not request data packets from multiple entities simultaneously. Further, the initiator RT may be configured to perform admission control to limit the amount of outstanding pulled data.

Referring to FIG. 6, the timing diagram 600 is shown for an example unsolicited push transaction. A push transaction may be used to "push" outgoing data packets to other entities, for example for a write operation. As shown, the push transaction is performed by various communication protocol layers of both the initiator entity and the target entity. For example, entity A may be the initiator entity and initiator ULP 610 and initiator RT 630 may be communication protocol layers configured as upper layer protocol 310 and reliable transport protocol layer 330 of FIG. 3, while entity B may be the target entity and target ULP 620 and target RT 640 may be communication protocol layers configured as upper layer protocol 320 and reliable transport protocol layer 340 of FIG. 3.

As shown, a push request ("pushReq") may originate from the initiator entity A, for instance from the initiator ULP 610, which is sent to the initiator RT 630. The initiator entity A may then push unsolicited data onto the target entity B, for instance over the connection 110. This may be performed by the respective RTs, thus the initiator RT 630 is shown pushing unsolicited data ("pushUnslctdData") to the target RT 640. The data is unsolicited because the target entity B did not request this data. Once the data is received by the target entity B, the target RT 640 may request for the received data to be placed or stored at the target entity B, and does so by sending a pushReq to the target ULP 620. In response, the target ULP 620 may place or store the received data, and then sends an acknowledgment message ULP-ACK to the target RT 640 acknowledging that the received data has been placed or stored according to the pushReq. For reliable transport, the target entity B sends an acknowledgment message ("ACK") to notify initiator entity A of the receipt and placement of the pushed data, for instance over the connection 110. This is performed by the respective RTs, thus as shown the target RT 640 sends the ACK message to the initiator RT 630. Once the ACK message is received by the initiator RT 630, the initiator RT 630 may send a push complete message ("pushCmpl") to initiator ULP 610 to notify that the data packet has been received and placed by the target entity.

As described with reference to FIG. 1, the initiator entity A and the target entity B may communicate with each other by transmitting packets. Thus the pushUnslctdData and ACK may each be a packet transmitted over the connection 110. Further as described with reference to FIG. 4, reliable transport packets may be tracked by sliding windows. As such, the pushUnslctdData packet may be part of a data TX sliding window kept by entity A (indicated by dash dot line). For reliable transport, the ACK packet sent by entity B may reference the PSN of the pushUnslctdData, which entity A may keep track of using the data TX sliding window. Acknowledgment messages such as the ACK packet (indicated by dot line) are not reliable transport packets, and thus may not be part of any sliding window at the sender entity B. However, because acknowledgments are cumulative— that is, an ACK received for a packet would indicate that ACKs must also have been sent for all previous packets within the sliding window—it is not necessary to make ACK messages reliable.

As illustrated by FIG. 6, the unsolicited push transaction allows an initiator entity to be notified not only of a pushed data packet being received, but also that it has been placed or stored by the target entity. In some instances, the initiator entity may wait until a pushed data packet is received and placed by the target entity before pushing another data packet. PushUnslctdData provides lower transaction latency, however, incast may still occur in the network if multiple initiators are sending to a same target. Such incast risk may be mitigated by limiting the size of request supported by pushUnslctdData.

In contrast to FIG. 6, FIG. 7 shows a timing diagram 700 for a solicited push transaction. As shown, the push transaction is performed by various communication protocol layers of both the initiator entity and the target entity. For example, entity A may be the initiator entity and initiator ULP 710 and initiator RT 730 may be communication protocol layers configured as upper layer protocol 310 and reliable transport protocol layer 330 of FIG. 3, while entity B may be the target entity and target ULP 720 and target RT 740 may be communication protocol layers configured as upper layer 320 and reliable transport protocol layer 340 of FIG. 3.

Similarly to FIG. 6, FIG. 7 shows that a pushReq may originate from the initiator entity A at the initiator ULP 710, which may be sent to the initiator RT 730. However, in contrast to the timing diagram 600, at this point the initiator RT 730 does not send the data packet to be pushed onto the target entity B. Rather, only a request is sent to the target entity B, for instance over the connection 110, which may or may not be granted by the target entity B. This request and grant process or "solicitation" process may be performed by the respective RTs, which for example may be performed by their respective solicitation sublayers. Thus the initiator RT 730 is shown sending a push request ("pushSlctdReq") to the target RT 740, and the target RT 740 may decide whether and/or when to grant the pushSlctdReq. From solicitation point of view, target pushGnt is analogous as initiator pullReq. For instance, entity B may limit the total number of outstanding granted pushSlctdData to prevent incast to entity B that causes congestion in the network. If and when the target RT 740 grants the request, the target RT 740 may send a push grant ("pushGrnt") back to the initiator RT 730.

Once the pushGrnt is received by the initiator entity A, the initiator entity A may push the solicited data to the target entity B, for instance over the connection 110. This may be performed by the respective RTs, thus the initiator RT 730 is shown pushing solicited data to the target RT 740. In contrast to the unsolicited data pushed in FIG. 6, the data here is effectively solicited by the pushGrnt from the target RT 740. Once the pushGrnt is received by the initiator RT 730, the rest of the timing diagram is analogous to FIG. 6. Accordingly, the target RT 740 may send a pushReq to the target ULP 720 for the received data to be placed or stored at the target entity B. In response, the target ULP 720 may place or store the received data, and then sends an ULP-ACK message to the target RT 740 acknowledging that the received data has been placed according to the pushReq. For reliable transport, the target entity B, through target RT 740, sends an ACK message to notify initiator entity A of the receipt and placement of the pushed data, for instance over the connection 110 to the initiator RT 730. Once the ACK message is received by the initiator RT 730, the initiator RT 730 may send a pushCmpl message to the initiator ULP 710 to notify that the data packet has been received and placed by the target entity B.

As described with reference to FIG. 1, the initiator entity A and the target entity B may communicate with each other by transmitting packets. Thus the pushSlctdReq, pushGrnt, pushSlctdData, and ACK may each be a packet transmitted over the connection 110. Further as described with reference to FIG. 4, reliable transport packets may be tracked by sliding windows. As such, the pushSlctdReq may be part of a request TX sliding window kept by entity A (indicated by dash line), the pushGrnt packet may be part of a data TX sliding window kept by entity B (indicated by dash dot line), and the pushSlctdData packet may be part of a data TX sliding window kept by entity A (indicated by dash dot line). For reliable transport, the ACK packet sent by entity B may reference the PSN of the pushSlctdData, which entity A may keep track of using the data TX sliding window. Likewise, though not shown, entity A may send ACK for the pushGrnt packet, which entity B may keep track of using its data TX sliding window, and entity B may send ACK for the pushSlctdReq, which entity A may keep track of using its request TX sliding window. However, acknowledgment messages such as the ACK packet shown (indicated by dot line) are not reliable transport packets, and thus may not be part of any sliding window at the sender entity B.

As illustrated by FIG. 7, the solicited push transaction allows an initiator entity to solicit a grant to send data from a target entity before actually sending the data. As such, the target entity may have control over the incoming data, which may be especially helpful when multiple initiator entities are attempting to push data onto the target entity, and also if the pushed data is large or if the network is congested. Since incast congestion may be caused by packets not being delivered to the receiver as fast as transmitted, and/or by multiple entities attempting to send packets simultaneously to the same entity, such a solicitation process may reduce incast congestion.

In some instances, the communication protocol system may be configured to perform one of the push transactions shown in FIGS. 6 and 7, while in other instances, the communication protocol system may be configured to perform both of the push transactions. Where the communication protocol system is configured to perform both of the push transactions, the system may be configured to determine which push transaction to use based on one or more factors. For instance, whether a push request should be sent as a solicited or unsolicited request may be determined by the initiator RT. The initiator RT may determine whether to send a solicited push request or an unsolicited push based on a length of the push request from the initiator ULP. As an example, if a push request requires a large amount of data to be pushed, such as meeting a predetermined size threshold, a solicited push request may be used to make sure that the large request does not cause congestion; otherwise an unsolicited push may be used. As another example, whether to use solicited request or unsolicited push may be based on network conditions, such as level of congestion, where a solicited request may be used when congestion meets a predetermined threshold level.

Figure 8:
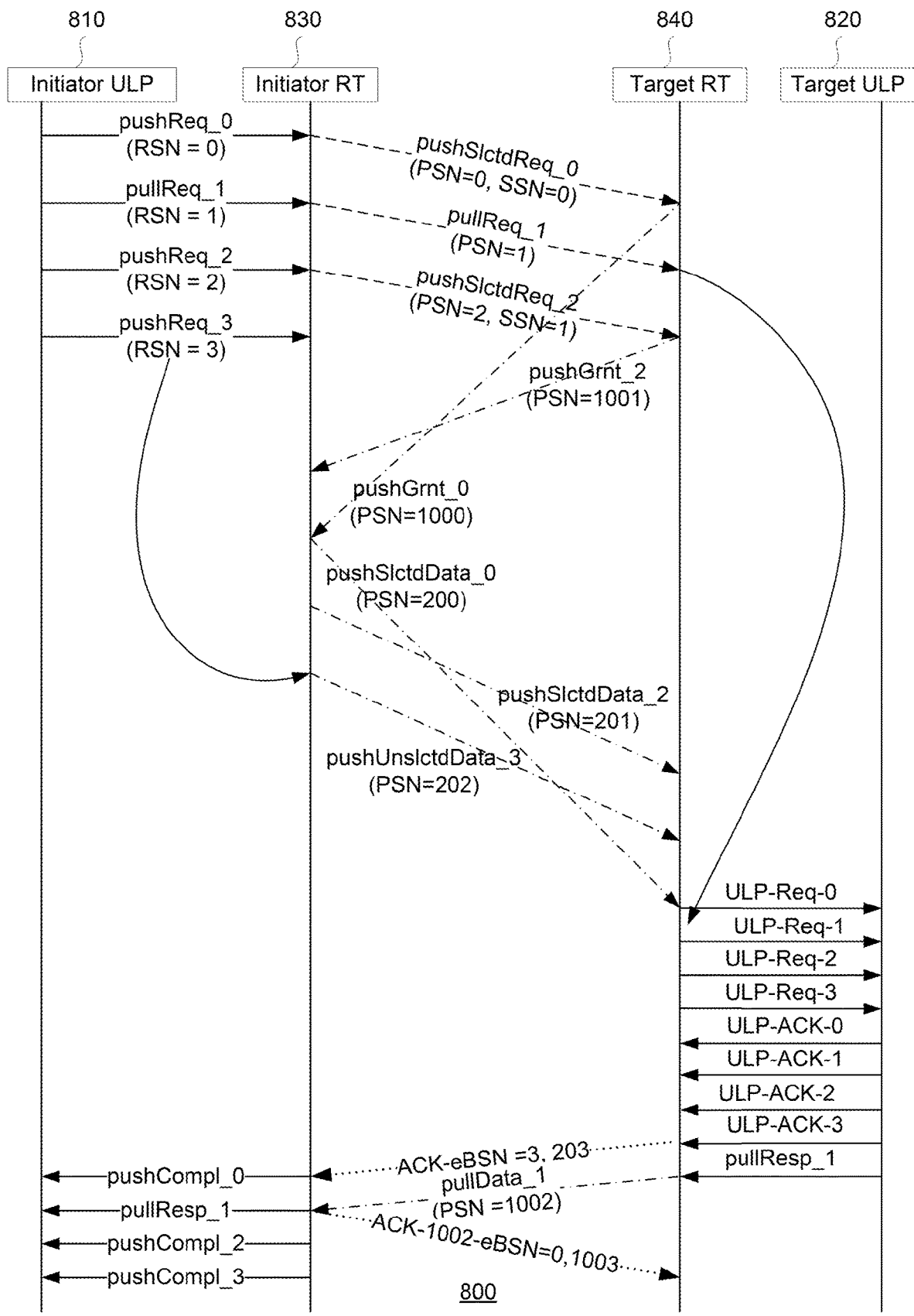
FIG. 8 is an example timing diagram of ordered transactions according to aspects of the technology.
Figure 9:
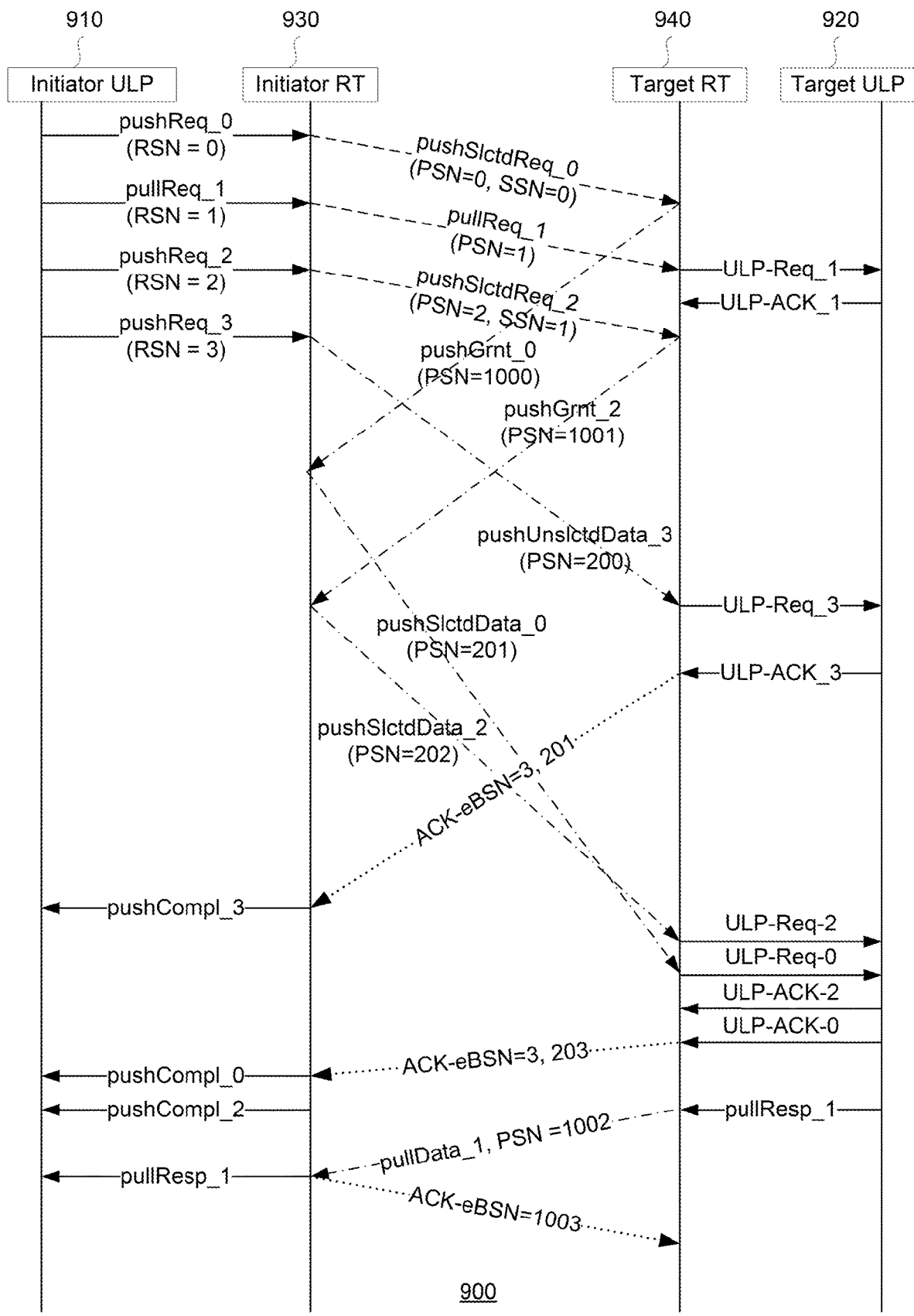
FIG. 9 is an example timing diagram of unordered transactions according to aspects of the technology.

In another aspect, the communication protocol system 300 of FIG. 3 may support both ordered and unordered transactions over a connection. In this regard, FIG. 8 shows an example timing diagram for ordered transactions over a connection according to aspects of the technology, and FIG. 9 shows an example timing diagram for unordered transactions over a connection according to aspects of the technology. The example timing diagrams of FIGS. 8-9 may be implemented by two entities in a network, such as entities A and B over connection 110 of FIG. 1, for example by processors 220 and 270 of FIG. 2.

Referring to FIG. 8, various transactions, such as the pull and push transactions described above with reference to FIGS. 5-7, may be performed by various communication protocol layers of both the initiator entity and the target entity. For example, entity A may be the initiator entity and initiator ULP 810 and initiator RT 830 may be communication protocol layers configured as upper layer protocol 310 and reliable transport protocol layer 330 of FIG. 3, while entity B may be the target entity and target ULP 820 and target RT 840 may be communication protocol layers configured as upper layer protocol 320 and reliable transport protocol layer 340 of FIG. 3.

Referring to the timing diagram 800, a number of requests may originate from the initiator entity A, including pull requests such as pullReq_1, and push requests such as pushReq_0, pushReq_2, and pushReq_3. As described above, these requests may be sent by the initiator ULP 810 to the initiator RT 830. Once the initiator RT 830 receives these requests, initiator RT 830 may optionally determine whether the push requests should be sent as solicited or unsolicited as described above with reference to FIG. 7. Thus in this example, the initiator RT 830 may determine that pushReq_0 and pushReq_2 are to be sent as solicited, while pushReq_3 is to be sent as unsolicited. The initiator RT 830 may then send these pull and push requests to the target RT 840, for example over the connection 110.

The requests may be sent by the initiator ULP 810 in a particular order as indicated by the Request Sequence Numbers ("RSN"), which may be assigned by the initiator ULP 810. In some instances, the initiator RT 830 may also assign Solicited Sequence Numbers ("SSN") specifically to solicited push requests, which may be an incremental number as shown. When the requests are sent as packets between two entities, the requests may be assigned with a sequence of numbers in ascending order according to the order of the RSN. Thus as shown, the requests may be assigned PSNs within one or more TX sliding windows maintained by initiator entity A according to the RSNs. For example, pushSlctdReq_0 is assigned PSN=0, pullReq_1 is assigned PSN=1, pushSlctdReq_2 is assigned PSN=2 within a request TX sliding window of entity A (indicated by dash lines pointing towards B). Note that since pushReq_3 from the initiator ULP 810 does not require solicitation as shown in FIG. 5, there is no corresponding pushUnslctdReq being sent between the RTs. While RSNs and SSNs may be known to the ULPs, the PSNs may be unknown to the ULPs but only used by the RTs in packets.

In response to the solicited push requests, push grants may be sent by the target RT 840 to the initiator RT 830 in the order of the received requests, such as pushGnt_0 and pushGnt_2. The push grants may be assigned with PSNs in ascending order within one or more TX sliding windows maintained by the target entity B according to the same order as the RSNs of the push requests. For example, pushGrnt_0 is assigned PSN=1000 and pushGrnt_2 is assigned PSN=1001 within a data TX sliding window of entity B (indicated by dash dot lines pointing towards A). However, the push grants may not be received in the same order by the initiator RT 830 as the order of transmission for the push requests. Thus as shown, pushGrnt_2 is received by the initiator RT 830 before the pushGrnt_0.

Nonetheless, the initiator RT 830 may determine the correct order of the push grants based on their respective PSNs, and push the data packets based on that order. As such, although pushGrnt_2 was received by the initiator RT 830 before pushGrnt_0, the initiator RT 830 may first push the data solicited by pushGrnt_0 with pushSlctdData_0 and then push the data solicited by pushGrnt_2 with pushSlctdData_2 to target RT 840. The pushed data packets are also assigned PSNs in ascending order within one or more TX sliding windows maintained by initiator entity A according to the order of transmission. For example, pushSlctdData_0 is assigned PSN=200 and pushSlctdData_2 is assigned PSN=201 within a data TX sliding window of entity A (indicated by dash dot lines pointing towards B). Note that the pushReq_3 does not require a grant as described with reference to FIG. 6, thus as indicated by the curved arrow skips directly to pushUnslctdData_3, which pushes the unsolicited data. In this example, pushUnslctdData_3 is assigned PSN=202 also in the data TX sliding window of entity A.

Target RT 840 receives the requests, and then sends corresponding requests to the target ULP 820 in the order of ULP-Req-0-1-2-3, which is in the same order as the transmission order of the requests from the initiator ULP 810 shown at the top of the timing diagram 800. As described above with reference to FIGS. 5-7, these ULP-Reqs ask the target ULP 820 for permission to pull data, or to place the pushed data at the target entity B. Note that the pull request pullReq_1 does not require a grant as described with reference to FIG. 5, thus as indicated by the curved arrow skips directly to the ULP-Req. In response to the ULP-Reqs as described above with reference to FIGS. 5-7, the target ULP 820 may send acknowledgement ULP-ACKs to the target RT 840. In this ordered system, the ULP-ACKs are sent in the order of ULP-ACK-0-1-2-3, which is the same as the order of transmission for the requests from the initiator ULP 810.

Following the ULP-ACKs, with respect to the push transactions, ACKs acknowledging the data packets (or data acknowledgments) are then sent by target RT 840 to initiator RT 830 to notify the safe receipt and placement of the reliable transport data packets. As an example, ACK-eBSN=3, 203 is sent by entity B to notify entity A that all request packets up to PSN=3 and all data packets up to PSN=203 have been received and placed. Once the ACK is received, initiator RT 830 may send a completion message pushCompl_0 to initiator ULP 810. Further, in some instances acknowledgment packets may be opportunistically piggybacked on other reliable transport packets. For example, the requests pushSlctdReq_0, pullReq_1, and pushSlctdReq_2, are reliable transport packets requiring an ACK, but these acknowledgments to requests (or request ACKs) are not explicitly shown in timing diagram 800 because they may be piggybacked on reliable transport packets such as pushGrnt_0 and pushGrnt_2.

Also following the ULP-ACKs, pull requests may also be responded to. Thus as shown, the target ULP 820 may send a pullResp_1 instructing target RT 840 to pull the requested data. Target RT 840 then sends the pulled data to the initiator RT 830 with pullData_1. In this example, pullData_1 is assigned PSN=1002 within the same data TX sliding window of entity B as the pushGrnts (indicated by dash dot line pointing towards A). The initiator RT 830 then sends a pullResp_1 to the initiator ULP 810 so that the initiator ULP 810 may place or store the received data packet at entity A. After the data packet is placed or stored at entity A, an acknowledgment may be sent to notify entity B of safe receipt. Thus as shown, ACK-eBSN=3, 203 is sent by entity A to notify entity B that the pullData_1 packet has been safely received.

In this ordered system, the completion messages received by the initiator ULP 810 near the bottom of timing diagram 800 are in the same order as the requests that were sent by initiator ULP 810 near the top of the timing diagram 800. This order is maintained on ULPs of both initiator and target entities, where the target RT presents requests to the target ULP in the same order as the initiator ULP sends requests to the initiator RT. This ordered system ensures that the requests are delivered once and only once over the connection. In contrast, there may not be ordering requirement between transactions going in different directions over the connection.

FIG. 9 shows an example timing diagram 900 for unordered transactions over a connection according to aspects of the technology. Timing diagram 900 may be performed by various communication protocol layers of both the initiator entity and the target entity. For example, entity A may be the initiator and initiator ULP 910 and initiator RT 930 may be communication protocol layers configured as upper layer protocol 310 and reliable transport protocol layer 330 of FIG. 3, while entity B may be the target entity and target ULP 920 and target RT 940 may be communication protocol layers configured as upper layer protocol 320 and reliable transport protocol layer 340 of FIG. 3.

Referring to timing diagram 900, many of the same transactions as timing diagram 800 are shown, and are labeled as such. For instance, once the various requests are sent from initiator ULP 910 to initiator RT 930, the requests are then transmitted to the target RT 940 similar to timing diagram 800. For the solicited push requests such as pushSlctdReq_0 and pushSlctdReq_2, push grants such as pushGrnt_0 and pushGrnt_2 are sent by target RT 940 to initiator RT 930. In response to the push grants, solicited data are pushed by initiator RT 930 to target RT 940 as shown with pushSlctdData_0 and pushSlctdData_2. For the unsolicited requests such as pushUnslctdReq_3, unsolicited data may be pushed by initiator RT 930 to target RT 940 as shown with pushUnslctdData_3. For the pull requests such as pullReq_1, pull requests may be sent by initiator RT 930 to target RT 940, then to target ULP 920. Target ULP 920 may then respond with pullResp_1, which target RT 940 responds with pullData_1 to initiator RT 930. Initiator RT 930 then sends pullResp_1 to initiator ULP 910, which handles the placing and/or storing of the pulled data at entity A. These packets may also be kept tracked of by sliding windows as described above with reference to FIG. 8.

Timing diagram 900 also illustrates several aspects where the unordered system is different from the ordered system of timing diagram 800. One difference is that the PSNs for the packets are assigned according to the order of transmission, rather than in accordance with the respective RSNs. For instance, the pushSlctdReq_0, pullReq_1, and pushSlctdReq_2 packets are assigned PSNs according to the order of transmission by the initiator RT 930, which happens to be the same order as the respective RSNs. The pushGrnt_0 and pushGrnt_2 packets also have PSNs in the order of the respective RSNs due to the transmission order. However, the pushUnslctdData_3, pushSlctdData_0, and pushSlctdData_2 packets are transmitted in a different order than the order of the respective RSNs, and thus resulting in PSNs not in the same order as the respective RSNs. As such, pushUnslctdData_3 has PSN=200 that is smaller than pushSlctdData_0 with PSN=201 and pushSlctdData_2 with PSN=202.

Another difference is that the target entity may handle the transactions out of order. Thus as shown, the ULP-Reqs and the ULP-ACKs in timing diagram 900 are not sent all after the various requests and grants have been passed around the respective RTs. Rather, the ULP-Req and ULP-ACK corresponding to a particular transaction are sent as soon as the request and/or grant between the RTs are completed with respect to that particular transaction. For example, with respect to the transaction pullReq_1, ULP-Req_1 and ULP-ACK-1 are transmitted as soon as the pullReq_1 is transmitted from the initiator RT 930 to the target RT 940. As another example with respect to the transaction pushUnslctdReq_3, ULP-Req_3 and ULP-ACK-3 are transmitted as soon as the pushUnslctdData_3 is transmitted from the initiator RT 930 to the target RT 940. With respect to transactions pushSlctdReq_0 and pushSlctdReq_2, the ULP-Reqs and ULP-ACKs are sent later, after the push grants and the solicited data packets are pushed from initiator RT 930 to target RT 940. Further, because pushSlctdData_0 is received at target RT 940 after the pushSlctdData_2, the ULP-Reqs and ULP-ACKs for these two are sent in reversed order. Still further, although ULP-Req-1 and ULP-ACK-1 may be transmitted before ULP-Req_3, ULP-ACK_3, ULP-Req-0, ULP-Req-2, ULP-ACK-0, and ULP-ACK-2, the target ULP 920 may nonetheless handle the pull request after the push requests.

As a consequence of the unordered handling of transactions by the target entity, the acknowledgements and completion messages may be sent out of order to the initiator entity. As such, the initiator may also handle the transactions out of order. Thus as shown, target RT 940 sends ACK for pushUnslctdData_3, which prompts initiator RT 930 to send pushCompl_3 to initiator ULP 910 before the ACK for pushSlctdData_0 and pushCompl_0, before pushCompl_2, and before pullResp_1. Further as shown, because the solicited pushes are completed in this example before the pull request, ACK for pushSlctdData_0, pushComp_0, and pushComp_2 may be transmitted before the pullResp_1 from initiator RT 930.

The unordered handling of transactions by the entities as shown in FIG. 9 allows certain transactions that are processing faster to proceed ahead of transactions that are processing slower over a given connection, which may increase the overall efficiency over the connection. For example, by allowing ULP-Reqs and ULP-ACKs to be transmitted out of order, this allows transactions with fewer steps, such as pulls and unsolicited pushes, to proceed ahead at the target ULP without waiting for other transactions with more steps at the RTs, such as solicited pushes, to complete the solicitation process. As another example, the pull request in this example may be handled later by the target ULP 920 because the push transactions have faster processing times. Additionally or alternatively, the network may deliver the packets out of order. The unordered handling of transactions may thus provide greater flexibility to speed up the overall system and increase throughput.

Figure 10:
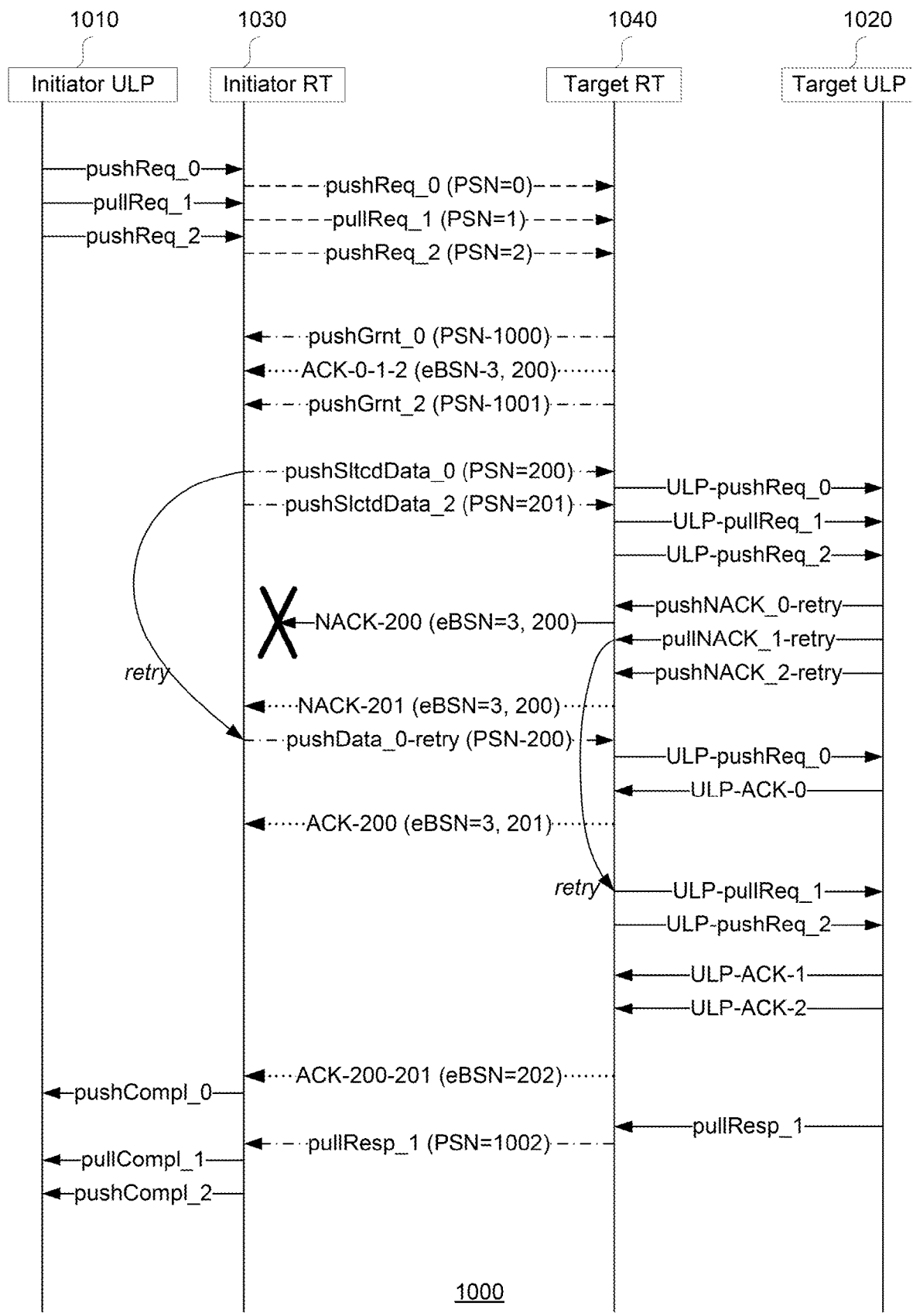
FIG. 10 is an example timing diagram involving negative acknowledgments according to aspects of the technology.
Figure 11:
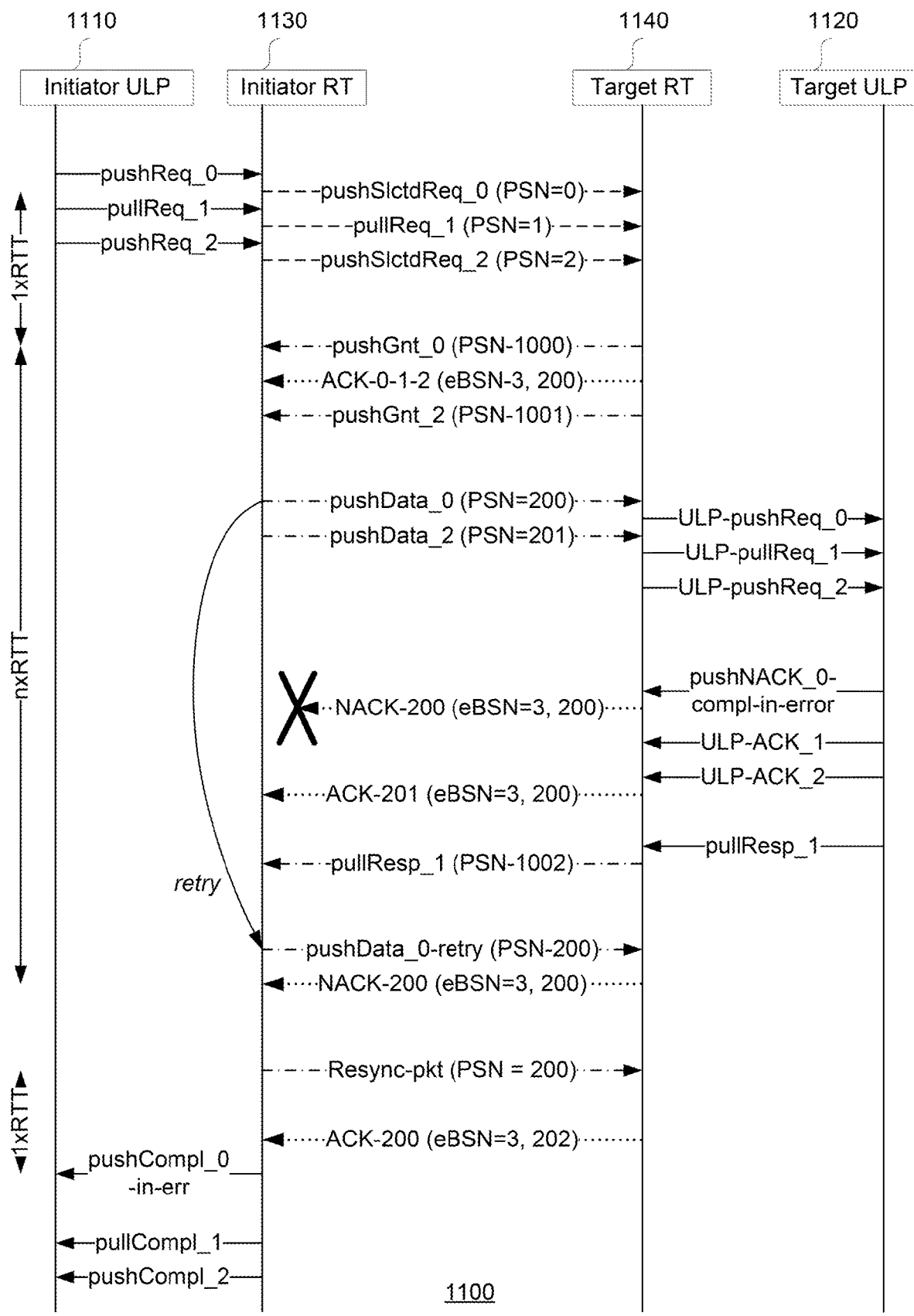
FIG. 11 is an example timing diagram involving complete-in-error acknowledgments according to aspects of the technology.

In still another aspect, the communication protocol system 300 of FIG. 3 may provide efficient error handling that reduces the chance of deadlock. In this regard, FIG. 10 shows an example timing diagram for a Receiver-Not-Ready ("RNR") negative acknowledgement ("NACK") according to aspects of the technology, and FIG. 11 shows an example timing diagram for a completion-in-error ("compl-in-error") NACK according to aspects of the technology. The example timing diagrams of FIGS. 10-11 may be implemented by two entities in a network, such as entities A and B over connection 110 of FIG. 1, for example by processors 220 and 270 of FIG. 2.

Referring to FIG. 10, various transactions, such as the pull and push transactions described above with reference to FIGS. 5-9, may be performed by various communication protocol layers of both the initiator entity and the target entity. For example, entity A may be the initiator entity and initiator ULP 1010 and initiator RT 1030 may be communication protocol layers configured as upper layer protocol 310 and reliable transport protocol layer 330 of FIG. 3, while entity B may be the target entity and target ULP 1020 and target RT 1040 may be communication protocol layers configured as upper layer protocol 320 and reliable transport protocol layer 340 of FIG. 3.

Referring to timing diagram 1000, many of the same transactions as timing diagram 800 are shown, and are labeled as such. For instance, timing diagram 1000 shows pushReq_0, pullReq_1, and pushReq_2 originating from the initiator ULP 1010. Once the various requests are sent from initiator ULP 1010 to initiator RT 1030, the requests are then transmitted to the target RT 1040 similar to timing diagram 800. For the solicited push requests pushSlctdReq_0 and pushSlctdReq_2, push grants pushGrnt_0 and pushGrnt_2 are sent by target RT 1040 to initiator RT 1030. In response to the push grants, solicited data are pushed by initiator RT 1030 to target RT 1040 as shown with pushSlctdData_0 and pushSlctdData_2. Also, the pull request pullReq_1 is sent by initiator RT 1030 to target RT 1040. The target RT 1040 then sends pushSlctdReq_0, pullReq_1, and pushSlctdReq_2 to target ULP 1020. The target RT 1040 also sends acknowledgment to the initiator RT 1030 for the requests with ACK-0-1-2.

However, in timing diagram 1000, the target entity is not ready for the push and pull requests. Accordingly, target ULP 1020 sends negative acknowledgements ("NACK") notifying that the target ULP 1020 is not ready, and that the target RT 1040 should try again later. Thus as shown, target ULP 1020 sends pushNACK_0-retry in response to the pushSlctdReq_1, pullNACK_1-retry in response to the pullReq_1, and pushNACK_2-retry in response to the pushSlctdReq_2. These NACKs may include the reason for the NACK, which in this example being that the target entity is not ready, and/or may include a new timer expiry value for retransmissions. The target RT 1040 then sends corresponding NACKs to the initiator RT 1030, shown as NACK-200 and NACK-201 referencing the PSNs of the pushSlctdData_0 and pushSlctdData_2 packets. Note that there is no NACK to the initiator for pullReq_1 because it had already been acknowledged earlier by ACK-0-1-2. Instead, target RT 1040 keeps track of the pullNACK-1-retry, and will re-deliver to target ULP 1020 upon timer expiry. Note that the NACKs have the same eBSN because the sliding window is stuck due to the inability to acknowledge to sender. However, while NACK-201 reaches the initiator RT 1030, for any of a number of reasons, the NACK-200 packet may be dropped in the network and does not reach the initiator RT 1030, and as mentioned earlier, ACK and NACK messages are not transmitted by reliable transport.

Because the initiator RT 1030 receives the NACK for pullSlctdReq_2, initiator RT does not attempt retransmission of pushSlctdData_2. In contrast, because the initiator RT 1030 does not receive the NACK for pushSlctdReq_0, initiator RT 1030 attempts retransmission with pushData_0-retry. For example, the initiator RT 1030 may be configured to attempt retransmission with the same PSN if it does not receive an ACK for the pushed data within a predetermined period of time. Once the target RT 1040 receives the pushData_0-retry, the target RT 1040 recognizes that pushData_0-retry is a retransmission of a data packet, for example based on the PSN of the pushData_0-retry being the same as the earlier received pushSlctdData_0. Target RT 1040 then sends ULP-pushReq_0 to target ULP 1020. This time, the target ULP 1020 is ready, and responds with ULP-ACK-0.

Then, after some time, target RT 1040 attempts again with ULP-pullReq_1 and ULP-pushSlctdReq_2 to target ULP 1020. As shown, this time the target ULP 1020 is ready and completes the requests. The rest of the timing diagram 1000 is similar to timing diagram 800, where the target ULP 1020 sends to target RT 1040 acknowledgments ULP-ACK-0, ULP-ACK-1, and ULP-ACK-2, then the target RT 1040 sends acknowledgments ACKs-200-201 to initiator RT 1030, and the initiator RT 1030 in turn sends completion messages pushComp_0 and pushCompl_2. For the pull request, the target ULP 1020 sends pullResp_1 to target RT 1040, which then sends pullResp_1 to initiator RT 1030, which then sends completion message pullCompl_1 to initiator ULP 1010.

Thus, FIG. 10 illustrates that, by allowing the initiator RT to retransmit requests and/or data when an ACK or NACK is not received within a predetermined period of time, RT works robustly and reliably over potentially lossy network. Further, by not allowing the initiator RT to retransmit when a NACK is received, congestion over the network may be reduced. Still further, by allowing the target RT to retransmit requests and/or data to target ULP, the requests may be handled at a later time when the target ULP is ready, rather than resulting in a deadlock or time-out.

Referring to FIG. 11, various transactions, such as the pull and push transactions described above with reference to FIGS. 5-9, may be performed by various communication protocol layers of both the initiator entity and the target entity. For example, entity A may be the initiator and initiator ULP 1110 and initiator RT 1130 may be communication protocol layers configured as upper layer protocol 310 and reliable transport protocol layer 330 of FIG. 3, while entity B may be the target entity and target ULP 1120 and target RT 1140 may be communication protocol layers configured as upper layer protocol 320 and reliable transport protocol layer 340 of FIG. 3.

Referring to timing diagram 1100, many of the same transactions as timing diagram 800 are shown, and are labeled as such. For instance, timing diagram 1100 shows pushReq_0, pullReq_1, and pushReq_2 originating from initiator ULP 1110. Once the various requests are sent from initiator ULP 1110 to initiator RT 1130, the requests are then transmitted to the target RT 1140 similar to timing diagram 800. For the solicited push requests pushSlctdReq_0 and pushSlctdReq_2, push grants pushGrnt_0 and pushGrnt_2 are sent by target RT 1140 to initiator RT 1130. In response to the push grants, solicited data are pushed by initiator RT 1130 to target RT 1140 as shown with pushSlctdData_0 and pushSlctdData_2. The pull request pullReq_1 is sent by initiator RT 1130 to target RT 1140. The target RT 1140 then sends pushSlctdReq_0, pullReq_1, and pushSlctdReq_2 to target ULP 1120.

However, in timing diagram 1100, for any of a number of reasons, the target ULP 1120 completes the pushSlctdData_0 in error. Accordingly, target ULP 1120 sends a pushNACK_0-compl-in-err notifying the target RT 1140 of the error. The NACK may include reason for the NACK, which in this example is that the placement or storing of the pushed data was completed in error. The NACK may optionally include information on the error, such as the reason. The target RT 1140 then sends a corresponding NACK to the initiator RT 1130, shown as NACK-200 referencing the PSN of the pushSlctdData_0. However, for any of a number of reasons, NACK-200 does not reach the initiator RT 1130. Further as shown, the target ULP 1120 completes the other requests successfully, and sends ULP-ACK_1, ULP-ACK_2, and pullResp_1 to target RT 1140, which prompts target RT 1140 to send ACK-201 and pullResp_1 to initiator RT 1130.

Because the initiator RT 1130 does not receive the NACK for pushSlctdReq_0, initiator RT 1130 attempts retransmission with pushData_0-retry. For example, the initiator RT 1130 may be configured to attempt retransmission with the same PSN if it does not receive an ACK for the pushed data within a predetermined period of time. Once the target RT 1140 receives the pushData_0-retry, the target RT 1140 recognizes that pushData_0-retry is a retransmission of a data packet, for example based on the PSN of the pushData_0-retry being the same as the earlier received pushSlctdData_0. As such, the target RT 1140 resends the NACK-200 without having to send another push request to the target ULP 1120.

Further, in response to the complete-in-error negative acknowledgement, a resynchronization may be performed. For instance as shown, the resynchronization may be initiated by the initiator RT 1130 with "resync-pkt." The resynchronization prompts the target RT 1140 to send an acknowledgement that allows the one or more current sliding windows to move to a next set of packets to be transmitted and/or received. As shown, this is done by the target RT 1140 sending an acknowledgement ACK-200, rather than a negative acknowledgment, to the initiator RT 1130 in response to the resync-pkt. The initiator RT 1130 then sends completion messages pushCompl_0-in-err, pullCompl_1, and pushCompl_2 to the initiator ULP 1110, which notifies of both successful completions and the completion in error.

FIG. 11 illustrates that the resynchronization process prevents the current sliding windows from being stuck. Further, in contrast to many protocols where a complete in error may result in time-out or tearing down of a connection, the resynchronization process allows a more resilient connection to be maintained between entities. FIG. 11 also illustrates an example timescale for the process. As shown, one roundtrip time ("RTT") may have passed between the time that the pushSlctdReq_0 is sent by the initiator RT 1130 and the pushGrnt_0 being received by the initiator RT 1130. Then, between the pushGrnt_0 being received by the initiator RT 1130 and the NACK-200 being receive by the initiator RT 1130, several RTTs may have passed. Another RTT may have passed between the time that the resync-pkt is sent by the initiator RT 1130 and the time that pushCompl_0-in-err is sent by the initiator RT 1130.

Although the examples of FIGS. 10 and 11 are provided for an ordered system, in other examples the timing diagrams may be performed by an unordered system. In such instances, similar process may be performed without the ordering requirements.

Returning to FIG. 3, the communication protocol system 300 may additionally be provided with or associated with one or more congestion control engines. Such congestion control engines may be configured with any of a number of algorithms, such as SWIFT, BBR, GCN, etc. In this regard, the congestion control algorithm may be implemented in software, firmware, or hardware. For example, the congestion control algorithm may be implemented in host software, in a network interface's ("NIC") firmware, or in a hardware rate update engine. For instance, the communication protocol system 300 may provide a rate update event and result queue interface to the rate update engine. Congestion signals may be provided in the event queue, which may include measurements of RTT, explicit congestion notification ("ECN") marking, retransmission status, etc.

Rate update engine may report the results back to the communication protocol system 300, based on which congestion control may be implemented. For example, the report may include congestion window ("Cwnd"), which is the total number of outstanding TX packets. When this value is between 0 and 1, the communication protocol system 300, for example the sender RT, may apply additional inter-packet gap to limit the number of packet transmission to be less than 1 per RTT. As another example, the report may include retransmission timeout ("RTO"), which is the time the sender entity waits before retransmitting a pending TX packet if no ACK is received.

FIGS. 12A-17B show example headers and definitions according to aspects of the technology. These example headers are provided merely as illustrations, and in practice may take any other format, and may include alternative or additional information. The example headers may be used by various communication protocol layers of entities when implementing the sliding window of FIG. 4, and/or the timing diagrams of FIGS. 5-11. For instance, FIGS. 12A-B describe an example base header to be included by all packets within a communication protocol system. FIGS. 13A-F describe example headers for request and grant packets in the communication protocol system. FIGS. 14A-C describe example headers for data packets in the communication protocol system. FIGS. 15A-B describe an example resynchronization packet in the communication protocol system. FIGS. 16A-B describe an example acknowledgement packet in the communication protocol system. FIGS. 17A-B describe an example negative acknowledgement packet in the communication protocol system.

Referring to FIGS. 12A and 12B, the example base header shown includes various fields of information. For instance, the "Proto Type" field may specify the various protocols to be used for the packet, such as RT protocol, ULP protocol, storage protocol, etc. The "ULP protocol" may specify the different ULP types supported, for example, RDMA, NVMe, etc. The "Packet Type" field may specify a type of the packet, such as the various requests, grants, data, ACK, NACK, resync, etc. described above. The base header may include various sequence numbers for the packet, such as PSN and RSN described above, as well as expected base packet sequence number in the RX direction for the data sliding window ("eDBSN") and expected base packet sequence number in the RX direction for the request sliding window ("eRBSN"). Further, the base header may include the destination CID identifying the communication direction over a connection towards the intended receiver entity.

Figure 13A:
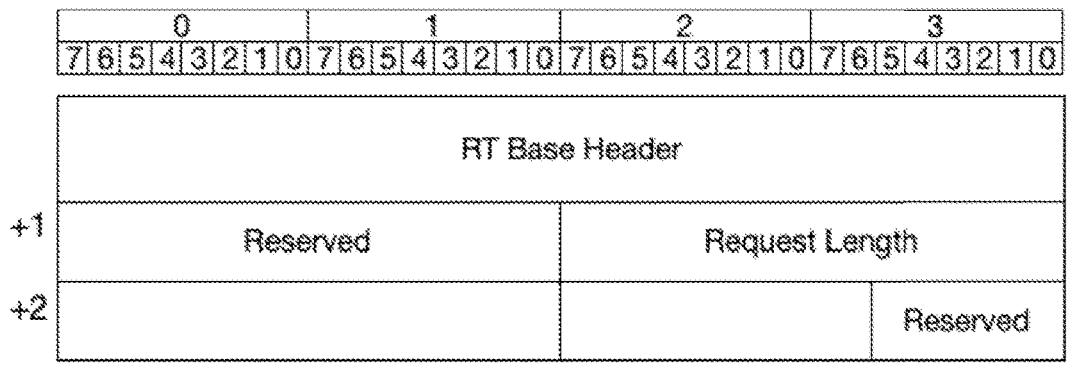
FIGS. 13A, 13B, and 13C show example request and grant headers according to aspects of the technology.
Figure 13B:
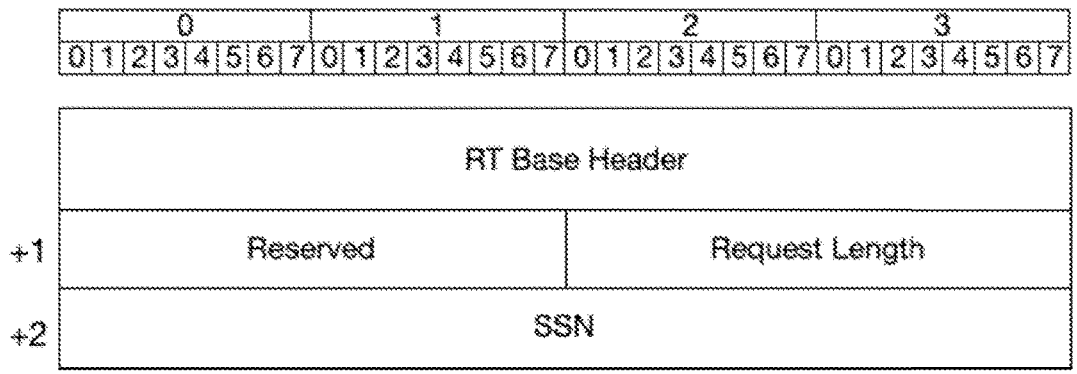
Figure 13C:
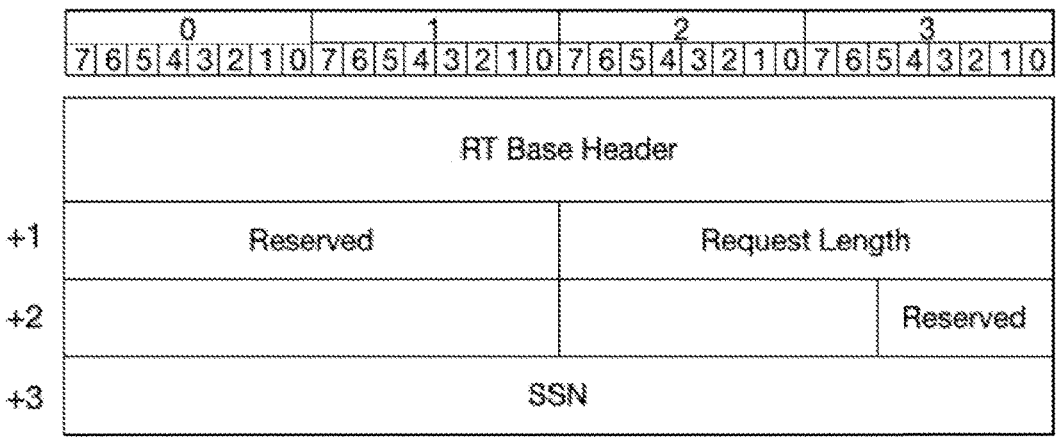

Turning to FIGS. 13A-13F, which show example request and grant headers each including the base header of FIG. 12A, and optionally some additional information. For instance, FIGS. 13A and 13D describe an example pull request header, which may include additional information such as a "request length" field specifying a size of the returning pull response packet, and/or reserved customizable fields. FIGS. 13B and 13E describe an example push request header, which may similarly include a request length field specifying size of the outgoing push data packet. For a solicited push request, the push request header may further include an SSN field specifying the order of the solicitation. FIGS. 13C and 13F describe an example push grant header for a solicited push request, which may include a request length field, an SSN field, SPH Reassembly Context ID and SPH Replay Count fields.

Figure 14A:
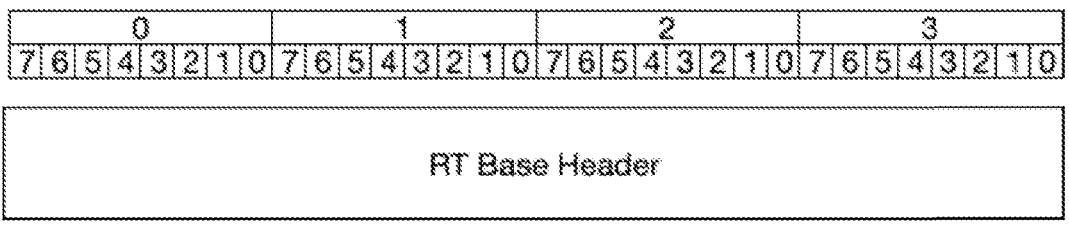
FIGS. 14A, 14B, and 14C show example data headers according to aspects of the technology.
Figure 14B:
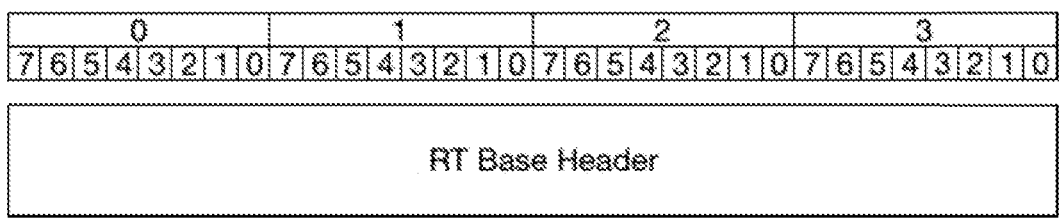
Figure 14C:
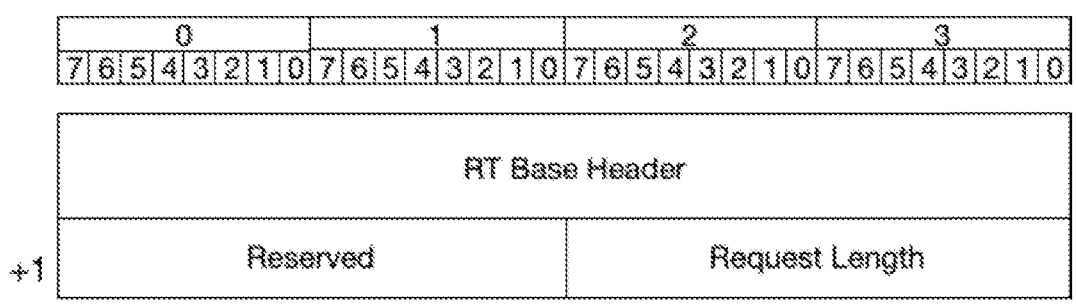

FIGS. 14A-14C show example data headers each including the base header of FIG. 12A, and optionally some additional information. For instance, the example pull data header in FIG. 14A and the example push data header in FIG. 14B each includes the base header of FIG. 12A, with no additional information. In contrast, the example push unsolicited data header of FIG. 14C includes the base header of FIG. 12A, but also additionally includes a request length field specifying a size of the unsolicited data packet being pushed.

FIGS. 15A and 15B describe an example resynchronization header, which includes the base header of FIG. 12A, and optionally additional information. For instance, the resynchronization header may include a "Resync Code" field specifying the target ULP to which the resynchronization packet is sent, memory deallocation, and other information. The resynchronization header may further include a "resynch type" field that specifies the type of the original packet being resynched. SSN may be provided if the resynch type is solicited push request or push grant.

FIGS. 16A and 16B describe an example acknowledgment or ACK header. Referring to FIG. 16A, the example ACK header includes some same fields as the base header of FIG. 12A, but instead of PSN and RSN fields, the ACK header includes "Receiver Data Window Sequence Bitmap" and "Receiver Request Window Sequence Bitmap" fields. As described with reference to FIG. 4, a value of "1" in such a bitmap indicates a packet has been acknowledged, a "0" indicates that the packet has not been acknowledged. Further, the value "NO" in the example ACK header for the field NACK indicates that the packet is an ACK instead of a NACK. Still further, the ACK header may include a congestion control metadata field, which RT may carry between two entities to facilitate congestion control algorithms, and one or more timestamps for measuring latency in the network.

FIGS. 17A and 17B describe an example negative acknowledgment or NACK header. Referring to FIG. 17A, the example NACK header includes some same fields as the base header of FIG. 12A, but instead of PSN and RSN fields, the NACK header includes a "NACK Sequence Number" field specifying the PSN of the packet being negatively acknowledged. The example NACK header also includes some same fields as the ACK header of FIG. 16. For example, the value "N1" in the example NACK header for the field NACK indicates that the packet is a NACK. The example NACK header also includes fields not found in the base header or the ACK header. The NACK header may include a "NACK code" field, which for example may provide reasons for the NACK, such as excessive network jitters, receiver resource resulted drop, receiver not ready, etc. The NACK header may also include a "wnd" field indicating the sliding window(s) the NACK is directed to. In the case of an RNR-NACK, the NACK header may further include an "RNR-NACK timeout" field, which specifies the timer expiry value for retransmission.

Figure 18:
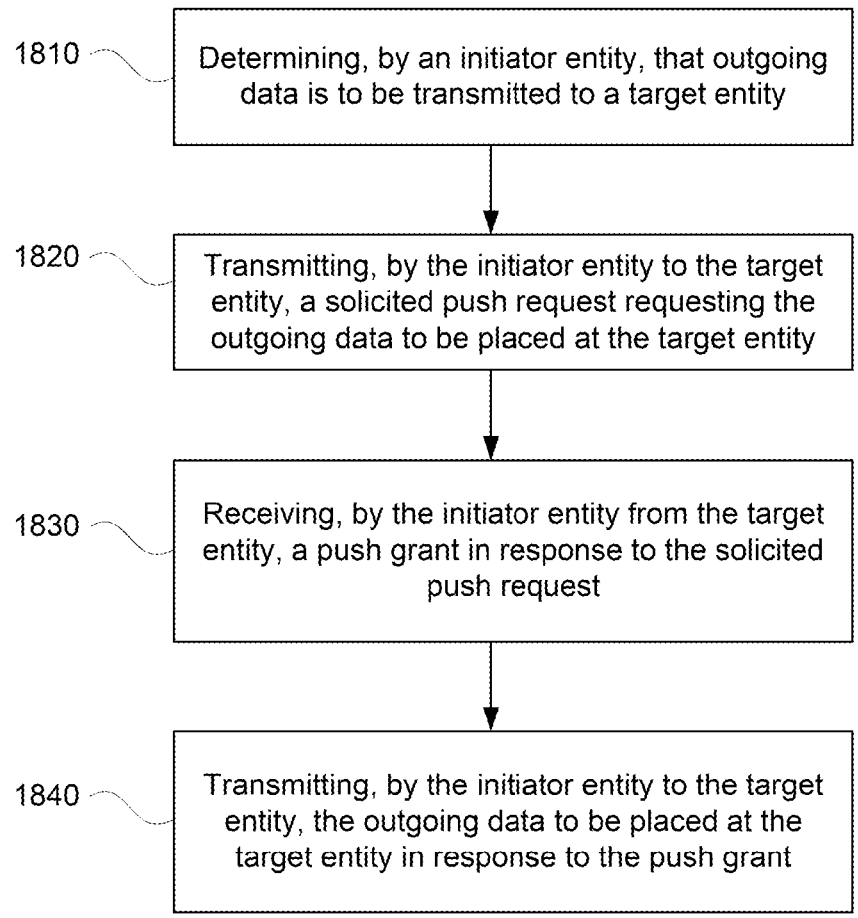
FIG. 18 is an example flow diagram according to aspects of the technology.

FIG. 18 shows an example flow diagram illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 18 illustrates one example method, variations of the methods may be performed, for instance as described above with reference to FIGS. 1-11.

Referring to FIG. 18, an example flow diagram 1800 is shown illustrating a solicited push transaction. The flow diagram 1800 may be performed by one or more entities in a network, such as by any of the entities A, B, C of FIG. 1, for example by processors 220 of FIG. 2. As mentioned above in reference to FIG. 2, the processors 220 may include processors on one entity, such as entity 110, or processors on multiple entities, such as on two or more of entities A, B, C, etc. As such, processors 220 may receive data, and perform reliable transport as described above with reference to FIGS. 1-11, which may include use of headers as shown in FIGS. 12A-17B.

Referring to FIG. 18, at block 1810, it is determined by an initiator entity that outgoing data is to be transmitted to a target entity. At block 1820, the initiator entity transmits to the target entity, a solicited push request requesting the outgoing data to be placed at the target entity. At block 1830, the initiator entity receives from the target entity, a push grant in response to the solicited push request. At block 1840, the initiator entity transmits to the target entity, the outgoing data to be placed at the target entity in response to the push grant.

The technology generally relates to communication protocols for reliable transport of packets over a connection. The technology provides solicitation based push transactions, which provides a receiver entity control over incoming data and thus reduce incast congestion and tail latency. The technology further supports unordered transactions over a connection using sliding windows and bitmaps, which may increase overall efficiency in handling of packets over the connection. The technology further provides handling of failed transmissions that reduces retransmission attempts and uses resynchronization to prevent tearing down of connections, thus resulting in more resilient connections.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   transmitting, by a sender entity over a connection to a receiver entity, a plurality of packets in a first order;
   maintaining, by the sender entity, one or more sliding windows including a plurality of bits, wherein each bit of the sliding window represents a respective packet of the plurality of packets;
   receiving, by the sender entity, one or more acknowledgments indicating that one or more of the plurality of packets have been received by the receiver entity, each of the acknowledgments referencing a respective packet of the plurality of packets; and
   modifying, by the sender entity, values of one or more of the plurality of bits in the sliding window corresponding to the one or more acknowledgments received,
   wherein a first bit in the sliding window is associated with a sender entity base sequence number (BSN) indicative of a transmitted packet, and
   wherein the method comprises comparing the sender entity BSN to a receiver entity BSN, the receiver entity BSN being indicative of an oldest packet yet to be received by the receiver entity, and updating the sender entity BSN based on the comparison of the sender entity BSN to the receiver entity BSN.

2. The method of claim 1, wherein the acknowledgments are received in a second order different from the first order.

3. The method of claim 1, further comprising:
   adjusting, by the sender entity, a size of the one or more sliding windows based on one or more congestion parameters.

4. The method of claim 1, wherein the plurality of packets includes one or more of: requests for data packets, data packets, or acknowledgments.

5. The method of claim 4, wherein the one or more sliding windows includes a request sliding window.

6. The method of claim 4, wherein the one or more sliding windows includes a data sliding window.

7. The method of claim 1, wherein the plurality of packets includes one or more data packets in response to a pull request.

8. The method of claim 1, wherein the plurality of packets includes at least one push grant packet in response to a solicited push request.

9. A system comprising one or more processors, the one or more processors configured to:
   transmit, over a connection to a receiver entity, a plurality of packets in a first order;
   maintain one or more sliding windows including a plurality of bits, wherein each bit of the sliding window represents a respective packet of the plurality of packets;
   receive one or more acknowledgments indicating that one or more of the plurality of packets have been received by the receiver entity, each of the acknowledgments referencing a respective packet of the plurality of packets; and
   modify values of one or more of the plurality of bits in the sliding window corresponding to the one or more acknowledgments received,
     wherein a first bit in the sliding window is associated with a sender entity base sequence number (BSN) indicative of a transmitted packet, and
     wherein the one or more processors are configured to compare the sender entity BSN to a receiver entity BSN, the receiver entity BSN being indicative of an oldest packet yet to be received by the receiver entity, and update the sender entity BSN based on the comparison of the sender entity BSN to the receiver entity BSN.

10. The system of claim 9, wherein the acknowledgments are received in a second order different from the first order.

11. The system of claim 9, wherein the one or more processors are further configured to:
    adjust a size of the one or more sliding windows based on one or more congestion parameters.

12. The system of claim 9, wherein the plurality of packets includes one or more of: requests for data packets, data packets, or acknowledgments.

13. The system of claim 12, wherein the one or more sliding windows includes a request sliding window.

14. The system of claim 12, wherein the one or more sliding windows includes a data sliding window.

15. The system of claim 9, wherein the plurality of packets includes one or more data packets in response to a pull request.

16. The system of claim 9, wherein the plurality of packets includes at least one push grant packet in response to a solicited push request.

17. One or more non-transitory computer-readable storage media encoded with instructions that are operable, when executed by one or more processors, cause the one or more processors to perform operations comprising:
    transmitting, over a connection to a receiver entity, a plurality of packets in a first order;
    maintaining one or more sliding windows including a plurality of bits, wherein each bit of the sliding window represents a respective packet of the plurality of packets;
    receiving one or more acknowledgments indicating that one or more of the plurality of packets have been received by the receiver entity, each of the acknowledgments referencing a respective packet of the plurality of packets; and
    modifying values of one or more of the plurality of bits in the sliding window corresponding to the one or more acknowledgments received,
    wherein a first bit in the sliding window is associated with a sender entity base sequence number (BSN) indicative of a transmitted packet, and
    wherein the operations comprise comparing the sender entity BSN to a receiver entity BSN, the receiver entity BSN being indicative of an oldest packet yet to be received by the receiver entity, and updating the sender entity BSN based on the comparison of the sender entity BSN to the receiver entity BSN.

18. The computer-readable storage media of claim 17, wherein the acknowledgments are received in a second order different from the first order.

19. The computer-readable storage media of claim 17, wherein the operations further comprise:
    adjusting, by the sender entity, a size of the one or more sliding windows based on one or more congestion parameters.

20. The computer-readable storage media of claim 17, wherein the plurality of packets includes one or more of: requests for data packets, data packets, or acknowledgments.

* * * * *